(12) United States Patent
Nishio

(10) Patent No.: US 8,006,599 B2
(45) Date of Patent: Aug. 30, 2011

(54) SCRIBE LINE FORMING MECHANISM, SCRIBE HEAD, AND SCRIBE DEVICE

(75) Inventor: Yoshitaka Nishio, Osaka (JP)

(73) Assignee: Mitsuboshi Diamond Industrial Co., Ltd., Osaka (JP)

( * ) Notice: Subject to any disclaimer, the term of this patent is extended or adjusted under 35 U.S.C. 154(b) by 605 days.

(21) Appl. No.: 10/596,878

(22) PCT Filed: Dec. 28, 2004

(86) PCT No.: PCT/JP2004/019654
§ 371 (c)(1),
(2), (4) Date: Mar. 5, 2007

(87) PCT Pub. No.: WO2005/063459
PCT Pub. Date: Jul. 14, 2005

(65) Prior Publication Data
US 2007/0199968 A1    Aug. 30, 2007

(30) Foreign Application Priority Data

Dec. 29, 2003   (JP) ................................. 2003-436932

(51) Int. Cl.
*C03B 33/027* (2006.01)
*C03B 33/10* (2006.01)
*C03B 33/00* (2006.01)
*B26F 3/00* (2006.01)

(52) U.S. Cl. .............................. 83/887; 83/879; 225/103

(58) Field of Classification Search .................... 83/879, 83/884–887, 483, 582; 225/2, 93.5, 94, 96–96.5, 225/103; 33/18.1, 27.031; 30/164.9–164.95, 30/310; 125/23.02
See application file for complete search history.

(56) References Cited

U.S. PATENT DOCUMENTS

| 1,511,016 | A |   | 10/1924 | Barker |
| 2,254,162 | A | * | 8/1941 | Wyman ........................ 30/164.95 |
| 3,399,586 | A | * | 9/1968 | Insolio et al. .................... 83/881 |
| 3,555,944 | A | * | 1/1971 | Imamura ......................... 83/886 |
| 3,570,336 | A | * | 3/1971 | Galla .............................. 83/886 |

(Continued)

FOREIGN PATENT DOCUMENTS

JP   2002-047023   2/2002

(Continued)

OTHER PUBLICATIONS

International Search Report dated Apr. 5, 2005.

(Continued)

*Primary Examiner* — Laura M. Lee
(74) *Attorney, Agent, or Firm* — Snell & Wilmer L.L.P.

(57) ABSTRACT

A scribing line forming mechanism according to the present invention includes: a scribing line forming means (207) being structured so as to form a scribing line on a substrate by contacting the substrate; and a supporting means for supporting the scribing line forming means such that the scribing line forming means is turnable about a first turning axis (204), the supporting means being structured so as to be turnable about a second turning axis (202), the second turning axis being different from the first turning axis, wherein the axial center of the first turning axis and the axial center of the second turning axis are approximately in parallel, and the axial center of the second turning axis is distant by a predetermined interval from a portion where the substrate and the scribing line forming means contact each other.

6 Claims, 21 Drawing Sheets

U.S. PATENT DOCUMENTS

| | | | |
|---|---|---|---|
| 3,797,340 A * | 3/1974 | Pereman | 83/886 |
| 4,228,711 A * | 10/1980 | Insolio | 83/881 |
| 4,372,471 A * | 2/1983 | Galindez | 225/1 |
| 4,383,460 A * | 5/1983 | Schotter et al. | 83/886 |
| 2003/0047048 A1 | 3/2003 | Momosaki | |

FOREIGN PATENT DOCUMENTS

| | | |
|---|---|---|
| JP | 2003-306339 | 10/2003 |
| WO | WO 03/011777 | 2/2003 |
| WO | WO 03/011777 A1 | 2/2003 |

OTHER PUBLICATIONS

European Supplemental Search Report from corresponding European Application No. 04816695.3 dated Aug. 9, 2010.

* cited by examiner

FIG.2
(a)
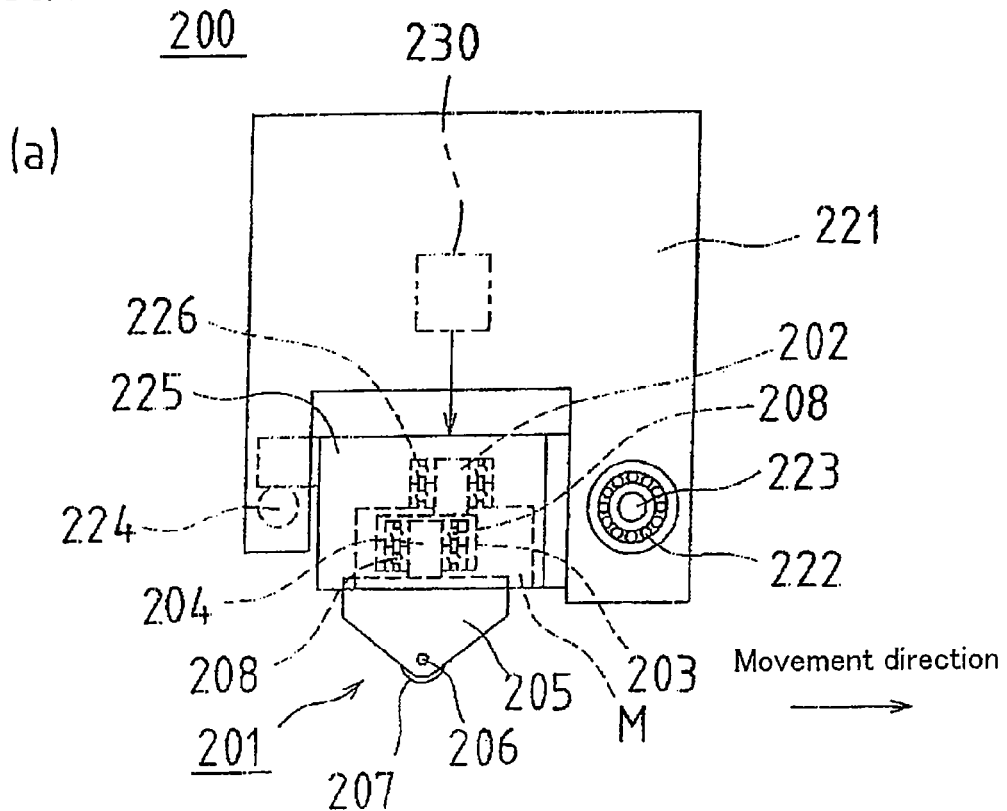
Movement direction →
(b)
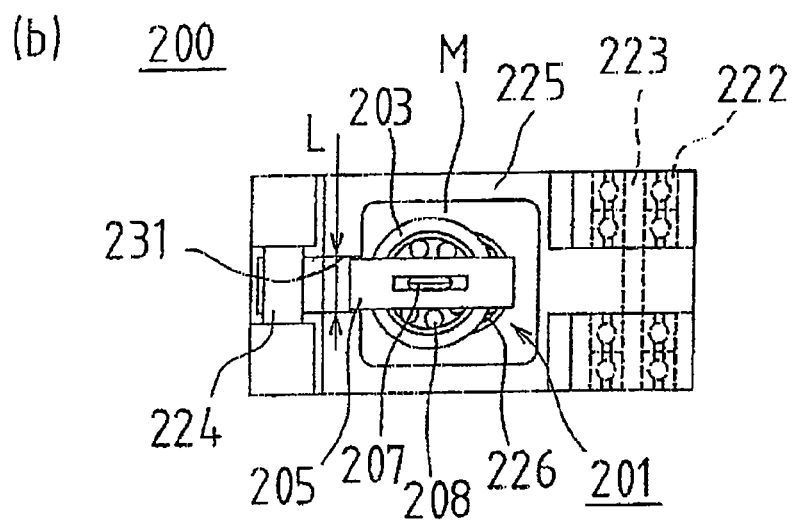

FIG.16
(a)
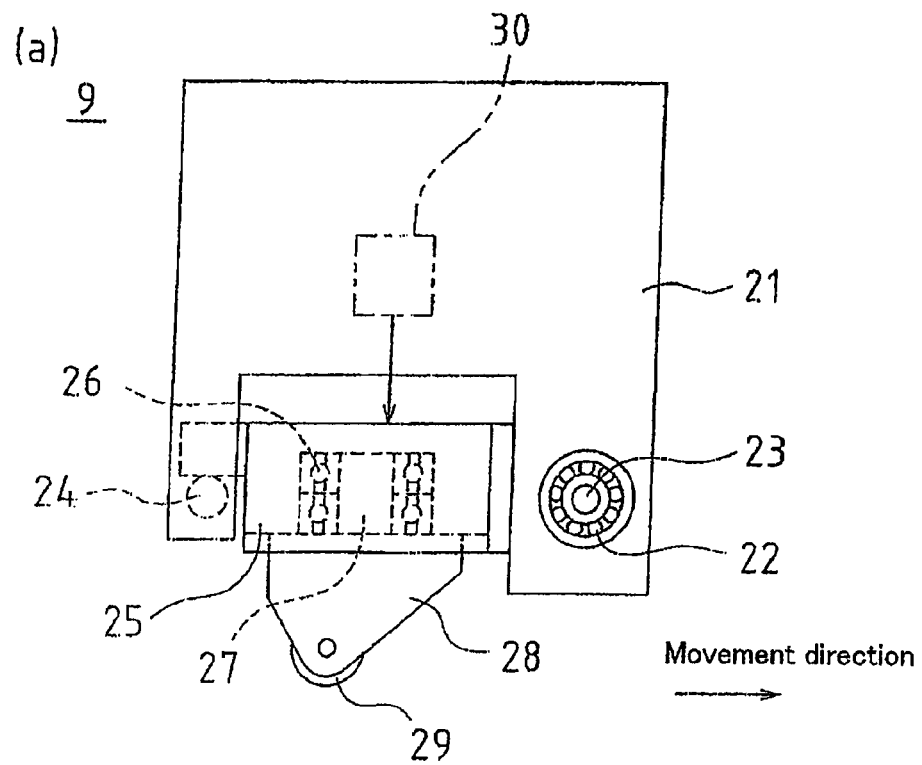
Movement direction →
(b)
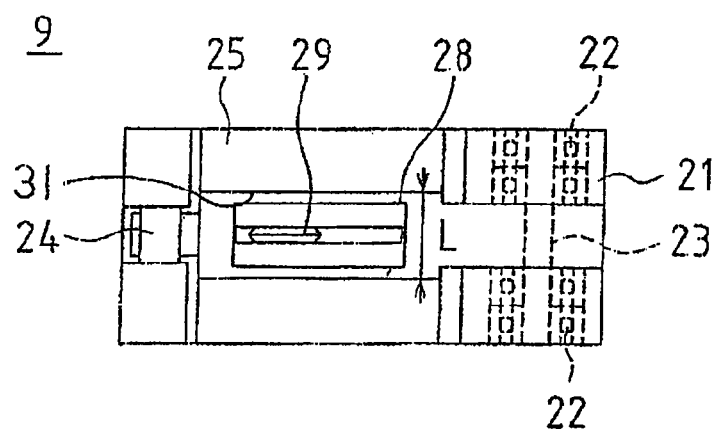
PRIOR ART

Movement direction →

PRIOR ART

PRIOR ART

FIG.19
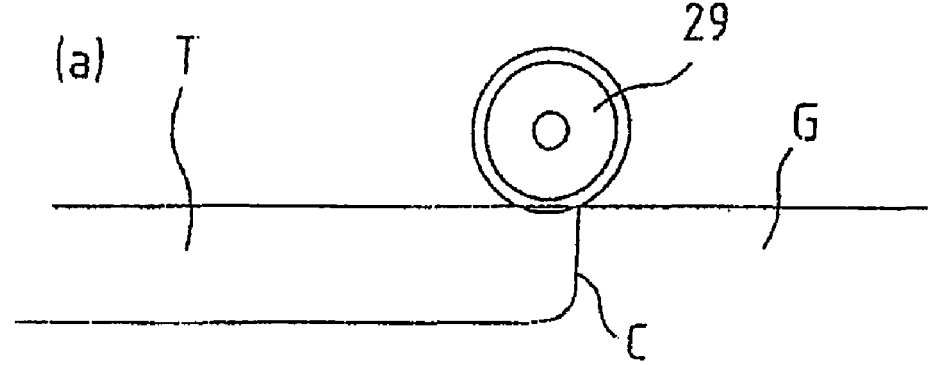
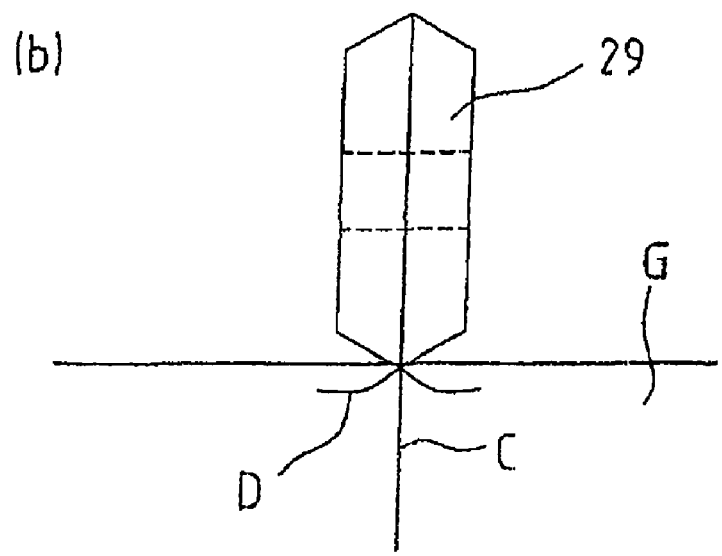
PRIOR ART (a) (b) (c)

PRIOR ART

FIG.21
(a)
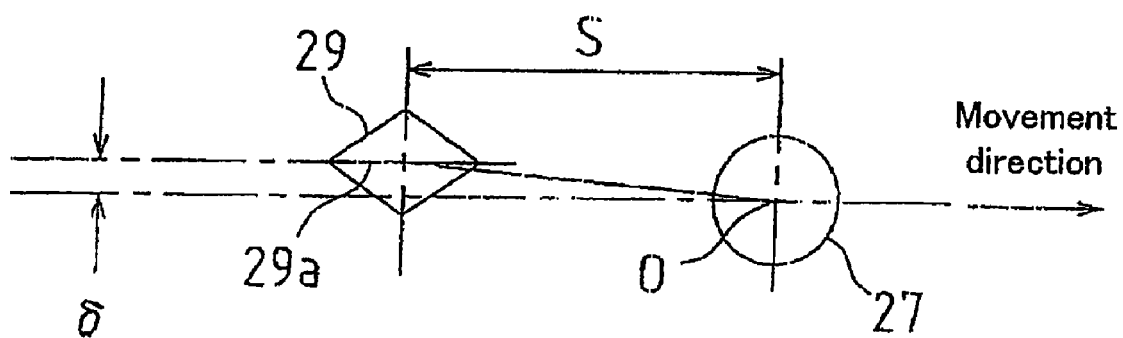
(b)
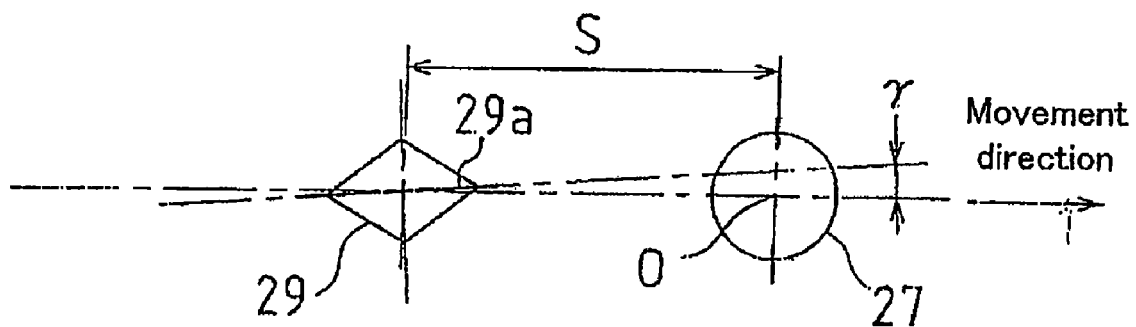
PRIOR ART

SCRIBE LINE FORMING MECHANISM, SCRIBE HEAD, AND SCRIBE DEVICE

TECHNICAL FIELD

The present invention relates to a scribing line forming mechanism used to form a scribing line on a substrate, a scribing head including the scribing line forming mechanism and a scribing apparatus including the scribing head.

BACKGROUND ART

For example, when a glass substrate (including a brittle material) is cut into a desired size, a cutting edge of a cutter wheel is pressed onto a surface of the brittle material with a predetermined force and is moved on the surface of the glass substrate. As a result, a scribing line is formed (hereinafter, referred to as a "scribing step"). Thereafter, a predetermined force is applied to the glass substrate along the scribing line (hereinafter, referred to as a "breaking step"). As a result, the glass substrate is cut along the scribing line.

FIG. 15 shows an example of a structure of a conventional scribing apparatus 10. The scribing apparatus 10 performs the scribing step.

The scribing apparatus 10 includes a table 11, a first guide rail 12A, a second guide rail 12B and a ball screw 13.

The table 11 is structured so as to be rotatable in a horizontal plane. A vacuum adsorption means (not shown) is provided in the table 11. The vacuum adsorption means fixes a substrate G (e.g., brittle substrate including a glass plate) mounted on the table 11 to the table 11. The first guide rail 12A and the second guide rail 12B support the table 11 such that the table 11 is movable in the Y-direction. The first guide rail 12A and the second guide rail 12B are provided in parallel to each other. The ball screw 13 moves the table 11 along the first guide rail 12A and the second guide rail 12B.

The scribing apparatus 10 further includes a first pillar 19A, a second pillar 19B, a guide bar 14, a sliding unit 15 and a motor 16.

The first pillar 19A and the second pillar 19B are vertically provided on a base of the scribing apparatus 10 having the first guide rail 12A and the second guide rail 12B interposed therebetween. The guide bar 14 is provided above the table 11 along the X-direction and constructed between the first pillar 19A and the second pillar 19B. The sliding unit 15 is provided on the guide bar 14 so as to be slidable. The motor 16 slides the sliding unit 15.

The scribing apparatus 10 further includes a scribing head 9, a motor 17 for moving the scribing head 9 upward and downward, a first CCD camera 18A and a second CCD camera 18B.

The scribing head 9 is provided in the sliding unit 15. The scribing head 9 includes a cutter wheel 29. The first CCD camera 18A and the second CCD camera 18B are provided above the guide bar 14 and detect an alignment mark formed on the substrate G.

The scribing head 9 presses the cutter wheel 29 onto the surface of the substrate G. When the motor 16 slides the sliding unit 15, the scribing head 9 moves along the guide bar 14. As a result, the cutter wheel 29 moves on the surface of the substrate G while it is being pressed onto the surface of the substrate G, and a scribing line is formed on the surface of the substrate G.

FIG. 16 shows an example of a structure of the scribing head 9. FIG. 16(a) shows a front view of the scribing head 9. FIG. 16(b) shows a bottom view of the scribing head 9.

The scribing head 9 includes a scribing head body 21, an axle bearing 22 provided in the scribing head body 21, a spindle 23 axially supported by the axle bearing 22, and a restraint axis 24 provided in the scribing head body 21 and in parallel to the spindle 23.

The scribing head 9 further includes a bearing case 25, an axle bearing 26, a turning axis 27, a cutting edge holder 28 and the cutter wheel 29. The bearing case 25 is contactable to the restraint axis 24. The axle bearing 26 is attached to the bearing case 25. The turning axis 27 is axially supported by the axle bearing 26 so as to be rotatable. The cutting edge holder 28 is turnable about the turning axis 27. The cutter wheel 29 is rotatable about a pin which is inserted at the lower end of the cutting edge holder 28. A blade 29b is formed so as to protrude in a V-shape toward the outer circumferential direction of the cutter wheel 29 (see FIG. 20). A cutting edge's ridge 29a is formed on the tip of the blade 29b (see FIG. 20).

A groove 31 having a width L is formed in the bearing case 25. A portion of the cutting edge holder 28 is embedded in the groove 31. The turning of the cutting edge holder 28 is restricted by the range of the width L of the groove 31.

The scribing head 9 further includes an energizing means 30 provided in the scribing head body 21. The energizing means 30 is, for example, an air cylinder or a servo motor. The energizing means 30 applies an energizing force to the cutter wheel 29 via the bearing case 25 and the cutting edge holder 28.

FIG. 17 shows the cutter wheel 29, the cutting edge holder 28 and the turning axis 27. An attachment position of the cutter wheel 29 with respect to the turning axis 27 will be described with reference to FIG. 16 and FIG. 17.

The cutter wheel 29 is axially supported by the cutter edge holder 28 so as to be rollable. The center of the rolling of the cutter wheel 29 is positioned away from the axial center O of the turning axis 27 by an offset distance S in a direction opposite to the movement direction of the scribing head 9.

Since the center of the rolling of the cutter wheel 29 is distant from the axial center O of the turning axis 27 by the offset distance S in a direction opposite to the movement direction of the scribing head 9, the cutter wheel 29 moves to follow the turning axis 27, which moves along with the scribing head 9 in a scribing step (hereinafter, the movement is referred to as a caster effect). The cutter wheel 29 is provided such that the axial center of turning axis 27 aligns with the movement direction of the cutter wheel 29 due to the rolling of the cutting edge's ridge 29a of the cutter wheel 29 (see FIG. 18 which is be described later).

FIG. 18 shows a positional relationship between the cutter wheel 29 and the turning axis 27 at the time of movement of the scribing head 9. Hereinafter, the caster effect will be described in further detail with reference to FIG. 16 and FIG. 18.

When the cutter wheel 29 is contacted to the substrate G in order to start the scribing step, the direction of the cutting edge's ridge 29a and the movement direction of the scribing head 9 (i.e., the movement direction of the turning axis 27) do not always align with each other. Rather, in almost all of the cases, the movement direction of the turning axis 27 and the direction of the cutting edge's ridge 29a do not coincide with each other (see FIG. 18(a) or FIG. 18(c)).

Thereafter, when the scribing head 9 moves, the direction of the cutting edge's ridge 29a is gradually changed along with the movement of the scribing head 9, and in a short amount of time, the direction of the cutting edge's ridge 29a and the movement direction of the axial center O of the turning axis 27 align with each other (FIG. 18(b)). As a result, the path of the cutter wheel 29, after the direction of the cutting edge's ridge 29a and the movement direction of the axis O of the turning axis 27 align with each other, is a straight line. Thus, the scribing line formed, by the cutter wheel 29, on the substrate is a straight line. In other words, when the direction of the cutting edge's ridge 29a of the cutter wheel 29 coincides with the axial center O of the turning axis 27, a force, which causes the cutter wheel 29 to move toward the direction where the axial center O is positioned, is generated. Such an effect is referred to as a caster effect, and the direction of the cutting edge's ridge 29a is gradually changed so as to align with the movement direction of the axial center O of the turning axis 27.

FIG. 19 shows a scribing line T, a vertical crack C and a horizontal crack D which are formed on the substrate G. FIG. 19(a) shows the scribing line T and the vertical crack C which are formed on the substrate G. FIG. 19(b) shows the vertical crack C and the horizontal crack D which are formed on the substrate G.

The scribing apparatus 10 forms the scribing line T having the continuous vertical crack C (see, for example, Reference 1). As the depth of the vertical crack C is deeper, the substrate G is more accurately broken along the scribing line T in a breaking step. As a result, the yield of the substrate improves.

When a load acting on the cutting edge of the cutter wheel 29 is larger, a deeper vertical crack C is formed. However, if the load acting on the cutting edge exceeds a predetermined magnitude, an internal distortion accumulated in the vicinity of the surface of the substrate G is saturated, a horizontal crack D occurs in a direction which is different from the forming direction of the vertical crack C. The horizontal crack D will cause a generation of a lot cullet powder and will cause a reduction of the yield of the substrate G which results from a poor quality of the cutting face of the substrate G.

FIG. 20 shows a structure of the cutter wheel 29. FIG. 20(a) is a front view of the cutter wheel 29. FIG. 20(b) is a side view of the cutter wheel 29. FIG. 20(c) is an enlarged view of a portion (portion A) of the cutter wheel 29 shown in FIG. 20(b).

The cutter wheel 29 is a disk-shaped wheel (diameter φ, width W). The cutter wheel 29 has a first side 93 and a second side 94. The blade 29b with an obtuse angle ω is formed on the outer circumference of the cutter wheel 29. The blade 29b is formed so as to protrude in a V-shape toward the outer circumferential direction of the cutter wheel 29. The cutting edge's ridge 29a is formed at the tip of the blade 29b and in the vicinity of the center of the first side 93 and the second side 94. An insertion hole 96 is formed in the vicinity of the center of the side of the cutter wheel 29.

A plurality of protrusions 81 and a plurality of grooves 95 are formed on the tip of the blade 29b. The plurality of protrusions 81 and the plurality of grooves 95 have a predetermined pitch P and a predetermined height h, respectively (see FIG. 20(c)). The plurality of protrusions 81 and the plurality of grooves 95 have a size in the order of the micrometers. Thus, they cannot be identified with the naked eye.

The cutter wheel 29 possesses an extremely high capability of forming a vertical crack which extends in the thickness direction of the substrate G. The cutter wheel 29 can form a deep vertical crack and can suppress the occurrence of a crack in horizontal direction along the surface of the substrate G.

If the vertical crack is deep enough, an accurate breaking along the scribing line can be performed in the breaking step, thereby improving the yield of the substrate G. Furthermore, the breaking step becomes easier, thereby easing or simplifying the structure of a breaking apparatus. Furthermore, it is possible to omit the breaking step.

In contrast, different from the cutter wheel 29, a protrusion or a groove is not formed on the cutting edge's ridge portion of a conventional cutter wheel. Thus, the conventional cutter wheel cannot form a vertical crack deep enough. As a result, the breaking step cannot be omitted.

Reference 1: Japanese Laid-Open Publication No. 2001-328833
Reference 2: Japanese Laid-Open Publication No. 9-188534

DISCLOSURE OF THE INVENTION

However, it is difficult to provide the cutter wheel 29 such that the axis O of the turning axis 27 is precisely positioned on a line extending from the rolling direction of the cutting edge's ridge 29a.

For example, due to processing error of grinding the cutter wheel 29 (material is, for example, a super-hard alloy), the cutting edge's ridge 29a is not always formed in just the middle of the thickness of the cutter wheel 29. Thus, the axial center O of the turning axis 27 is not always positioned on the line extending from the rolling direction of the cutting edge's ridge 29a of the cutter wheel 29.

For example, in order to allow the rotation of the cutter wheel 29, it is necessary to provide a gap between the cutting edge holder 28 and the cutter wheel 29. Thus, the line extending from the cutting edge's ridge 29a of the cutter wheel 29 and the axial center O of the turning axis 27 of the cutting edge holder 28 do not cross each other. There is a presence of a slight gap at least about 0.01 mm between the line extending from the cutting edge's ridge 29a of the cutter wheel 29 and the axial center O of the turning axis 27 of the cutting edge holder 28 in a direction perpendicular to the movement direction of the scribing head 9.

FIG. 21 shows: the offset distance S between the cutter wheel 29 and the turning axis 27; a gap width δ between the cutting edge's ridge 29a of the cutter wheel 29 and the axial center O of the turning axis 27; and a gap angle γ of the turning axis 27 with respect to the movement path of the cutter wheel 29. FIG. 21(a) shows the offset distance S and the gap width δ. FIG. 21(b) shows the offset distance S and the gap angle γ.

When the scribing head 9 is moved from the state shown in FIG. 21, owing to the caster effect which occurs between: the contacting point between the cutter wheel 29 and the substrate G; and the axial center of the turning axis 27, the cutter wheel 29 is moved from the position shown in FIG. 21(a) to the position shown in FIG. 21(b). However, as shown in FIG. 21(b), while the center of the cutting edge of the cutter wheel 29 is positioned on the line extending in the movement direction of the axial center O, the direction of the cutting edge's ridge 29a is deviated by the gap angle γ with respect to the movement direction of the axial center O. Therefore, the cutter wheel 29 tries to roll along the line extending from the cutting edge's ridge 29a of the cutter wheel 29. As a result, the cutter wheel 29 tries to return from the position shown in FIG. 21(b) to the position shown in FIG. 21(a). Thus, the cutter wheel 29 meanders between the position shown in FIG. 21(a) and the position shown in FIG. 21(b). As a result, the movement path (i.e., scribing line) of the cutter wheel 29 meanders.

Due to the meandering of the cutter wheel 29, a force in the horizontal direction is applied to the substrate, and the horizontal crack D is formed on the substrate. The horizontal crack D will cause a generation of a lot cullet powder and will cause a reduction of the yield of the substrate G which results from a poor quality of the cutting face of the substrate G. Even when a substrate G is cut along a straight line, if the scribing line meanders, a cut face with a high degree of straightness cannot be obtained.

The present invention is made in view of the problems described above. The objective of the present invention is to provide: a scribing line forming mechanism capable of improve a straightness accuracy of the movement path of a scribing line forming means and preventing the occurrence of a horizontal crack; a scribing head including the scribing line forming mechanism; and a scribing apparatus including the scribing head.

A scribing line forming mechanism according to the present invention includes: a scribing line forming means being structured so as to form a scribing line on a substrate by contacting the substrate; and a supporting means for supporting the scribing line forming means such that the scribing line forming means is turnable about a first turning axis, the supporting means being structured so as to be turnable about a second turning axis, the second turning axis being different from the first turning axis, wherein the axial center of the first turning axis and the axial center of the second turning axis are approximately in parallel, and the axial center of the second turning axis is distant by a predetermined interval from a portion where the substrate and the scribing line forming means contact each other, thereby the objective described above being achieved.

According to the scribing line forming mechanism of the present invention, the scribing line forming means follows the movement direction of the second turning axis owing to the caster effect, and at the same time, the scribing line forming means can turn in a manner such that the difference (gap angle) between: a direction in which a pulling force acts between the second turning axis and the scribing line forming means; and a direction in which the scribing line forming means moves is smaller, the gap angle resulting from an error (gap width) between the scribing line forming means and a supporting means. As a result, it is possible to reduce the friction which acts in the horizontal direction of the substrate between the scribing line forming means and the substrate, thereby preventing the occurrence of a horizontal crack. It is possible to suppress the meandering of the scribing line forming means and form a scribing line with a high degree of straightness on the substrate.

The scribing line forming means may include a cutter wheel, and the supporting means may include a cutter supporting means for the cutter wheel such that the cutter wheel is rotatable. The cutting edge of the cutter wheel turns about the first turning axis and immediately aligns with the direction of the movement path of the first turning axis. Thereafter, in accordance with the movement of the cutting edge, the movement path of the cutting edge promptly overlaps the movement path of the second turning axis. Thus, it is possible to form a scribing line with a high degree of straightness on the substrate.

The supporting means may include a bearing for supporting the scribing line forming means. Since the scribing line forming means is supported by a bearing, the turning about the turning axis is smoothly carried out.

A scribing head according to the present invention includes: the scribing line forming mechanism described above; and a pressure application means for applying a pressure force to the scribing line forming mechanism in order to the scribing line forming means to the substrate, thereby the objective described above being achieved.

According to the scribing head of the present invention, it is possible to suppress the meandering when the scribing line forming means moves and prevent an uneven scribing pressure from being applied to the scribing line forming means.

The scribing head further may include a first supporting means for supporting the supporting means such that the supporting means is turnable about the second turning axis; and a restriction means for restricting the scribing line forming means approaching the substrate, wherein the first supporting means is structured so as to be turnable about a third turning axis, the third turnable axis having an axial center vertical to the axial center of the second turning axis, the restriction may include a restraining means, the restraint means being structured so as restrain the turning of the first supporting means about the third turning axis and such that a portion of the first supporting means contact the restraining means.

The first supporting means may include a turning restriction means for restricting the turning of the supporting means about the second turning axis.

The turning restriction means may be formed in a portion of the first supporting means so as to be able to accommodate at least a portion of the scribing line forming means.

A scribing apparatus according to the present invention includes: a scribing head; and a moving means for moving the scribing head on a surface, the surface being approximately parallel to the substrate, such that the scribing line forming means forms the scribing line on the substrate, thereby the objective described above being achieved.

According to the scribing apparatus of the present invention, it is possible to suppress the meandering when the scribing line forming means moves and prevent an uneven scribing pressure from being applied to the scribing line forming means.

According to the scribing line forming mechanism, the scribing head and the scribing apparatus of the present invention, the scribing line forming means follows the movement direction of the second turning axis owing to the caster effect, and at the same time, the scribing line forming means can turn in a manner such that a gap angle (angle between: a direction in which a pulling force acts between the second turning axis and the scribing line forming means; and a direction in which the scribing line forming means moves), which results from an error between the scribing line forming means and a supporting means, is smaller. As a result, it is possible to reduce the friction which acts in the horizontal direction of the substrate between the scribing line forming means and the substrate, thereby preventing the occurrence of a horizontal crack. It is possible to suppress the meandering of the scribing line forming means and form a scribing line with a high degree of straightness on the substrate.

BRIEF DESCRIPTION OF THE DRAWINGS

FIG. 2 is a diagram showing an example of a structure of a scribing head 200 according to the Embodiment of the present invention.

FIG. 16 is a diagram showing an example of a structure of a scribing head 9.

FIG. 19 is a diagram showing a scribing line T, a vertical crack C and a horizontal crack D which are formed on the substrate G.

FIG. 21 is a diagram showing: an offset distance S between the cutter wheel 29 and the turning axis 27; a gap width δ between the cutting edge's ridge 29a of the cutter wheel 29 and the axial center O of the turning axis 27; and a gap angle γ of the turning axis 27 with respect to the movement path of the cutter wheel 29.

Figure 1:
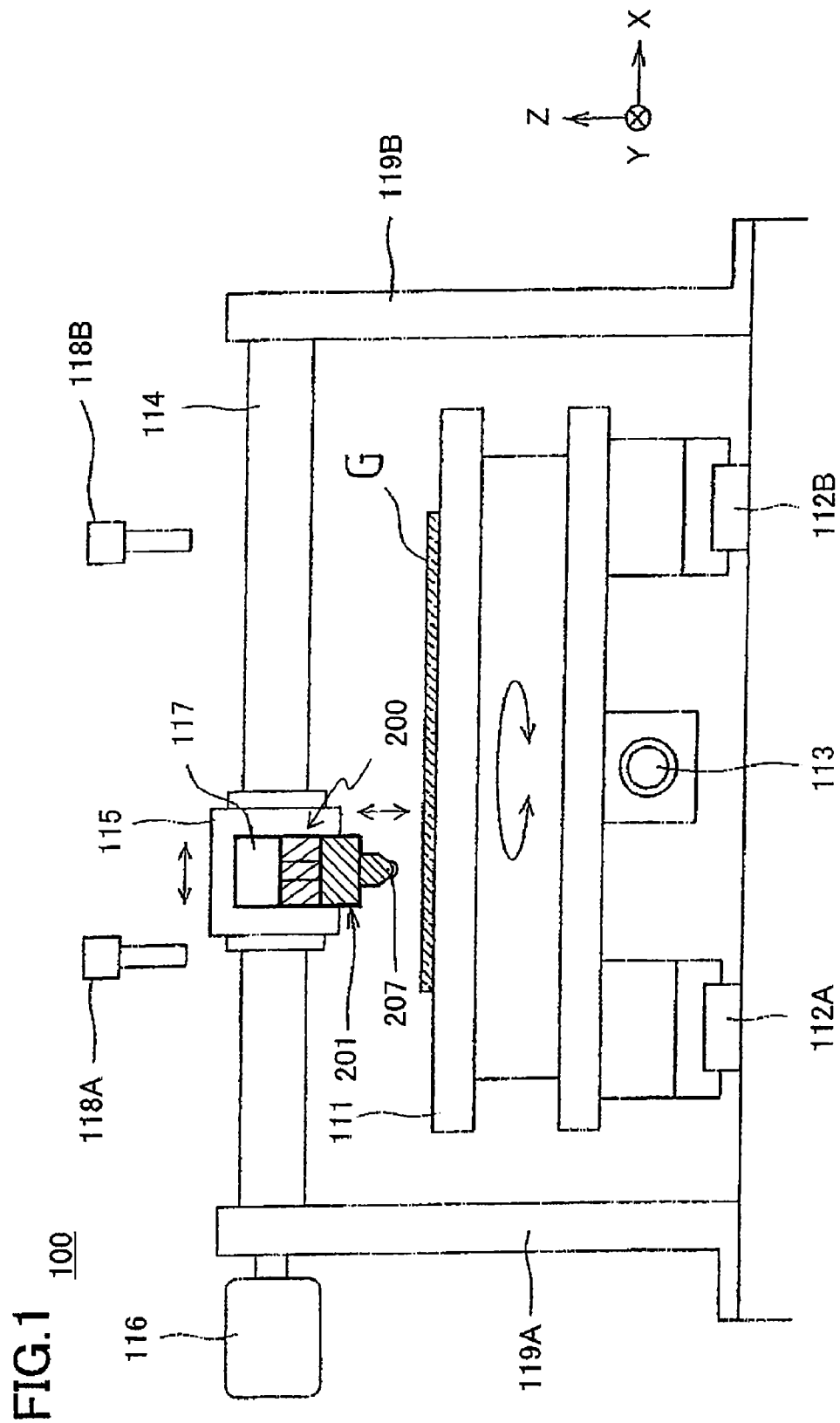
FIG. 1 is a diagram showing an example of a structure of a scribing apparatus 100 according to an Embodiment of the present invention.

100 scribing apparatus
111 table
112A first guide rail
112B second guide rail
113 ball screw
114 guide bar
115 sliding unit
116 first motor
117 second motor
118A first CCD camera
118B second CCD camera
119A first pillar
119B second pillar
200 scribing head
201 scribing line forming mechanism

BEST MODE FOR CARRYING OUT THE INVENTION

Hereinafter, Embodiments of the present invention will be described with reference to the accompanying drawings.

1. Scribing Apparatus

FIG. 1 shows an example of a structure of a scribing apparatus 100 according to an Embodiment of the present invention. The scribing apparatus 100 includes a table 111, a first guide rail 112A, a second guide rail 112B and a ball screw 113.

The table 111 is structured so as to be rotatable in a horizontal plane. A vacuum adsorption means (not shown) is provided in the table 111. The vacuum adsorption means fixes a substrate G (e.g., brittle substrate including a glass plate) mounted on the table 111 to the table 111. The first guide rail 112A and the second guide rail 112B support the table 111 such that the table 111 is movable in the Y-direction. The first guide rail 112A and the second guide rail 112B are provided in parallel to each other. The ball screw 113 moves the table 111 along the first guide rail 112A and the second guide rail 112B.

The scribing apparatus 100 further includes a first pillar 119A, a second pillar 119B, a guide bar 114, a sliding unit 115, a first motor 116 and a second motor 117.

The scribing apparatus 100 further includes a scribing head 200, a first CCD camera 118A, a second CCD camera 118B. The scribing head 200 is provided in the sliding unit 115. The scribing head 200 includes a scribing line forming mechanism 201.

The first pillar 119A and the second pillar 119B are vertically provided on a base of the scribing apparatus 100 having the first guide rail 112A and the second guide rail 112B interposed therebetween. The guide bar 114 is provided above the table 111 along the X-direction and constructed between the first pillar 119A and the second pillar 119B. The sliding unit 115 is provided on the guide bar 114 so as to be slidable. The first motor 116 slides the sliding unit 115 along the guide bar 114. The second motor 117 moves the scribing line forming mechanism 201 upward and downward.

The scribing head 200 presses the scribing line forming mechanism 201 onto the surface of the substrate G. When the motor 116 slides the sliding unit 115, the scribing head 200 moves along the guide bar 114. As a result, the scribing line forming mechanism 201 moves on the surface of the substrate G while it is being pressed onto the surface of the substrate G, and the scribing line forming mechanism 201 forms a scribing line on the surface of the substrate G.

The first CCD camera 118A and the second CCD camera 118B are provided above the guide bar 114 and detect an alignment mark formed on the substrate G.

The scribing apparatus 100 according to the Embodiment includes one scribing head 200. However, the number of the scribing head included in the scribing apparatus 100 is not limited to one. The number of the scribing head included in the scribing apparatus 100 is arbitrary. For example, when the scribing apparatus 100 includes a plurality of scribing heads 200, a plurality of scribing lines are simultaneously formed on a first surface of the substrate G and a second surface which is opposite to the first surface.

2. Scribing Head

FIG. 2 shows an example of a structure of a scribing head 200 according to the Embodiment of the present invention. FIG. 2(a) shows a front view of the scribing head 200. FIG. 2(b) shows a bottom view of the scribing head 200.

The scribing head 200 includes a scribing head body 221, a third axle bearing 222 provided in the scribing head body 221, a third spindle 223 axially supported by the third axle bearing 222, and a restraint axis 224 provided in the scribing head 221 and in parallel to the third spindle 223.

The scribing head 200 further includes a bearing case 225 and an axle bearing 226. The bearing case 225 is contactable to the restraint axis 224. The second axle bearing 226 is attached to the bearing case 225.

The scribing head 200 further includes a scribing line forming mechanism (cutting edge holder) 201. The scribing line forming mechanism 201 includes a second turning axis 202, a holder 203, a first turning axis 204, a holder body 205, a pin 206, a scribing line forming means (cutter wheel) 207 and a first axle bearing 208. The scribing line forming mechanism 201 will de described later in detail.

A recessed portion M is formed in the bearing case 225 such that the holder 203 can be inserted therein. An insertion opening is formed in the back of the recessed portion M. The insertion opening is used for inserting a bearing attached to the second turning axis 202 therein. The second turning axis 202 is inserted into the bearing insertion opening at the lower surface of the bearing case 225 via the bearing.

A groove 231 having a width L is formed in the bearing case 225. A portion of the holder body 205 is embedded in the groove 231. The turning about the first turning axis 204 of the scribing line forming mechanism 201 is restricted by the range of the width L of the groove 231.

The scribing head 200 further includes an energizing means 230 provided in the scribing head body 221. The energizing means 230 is, for example, an air cylinder or a servo motor. The energizing means 230 applies an energizing force to the scribing line forming means 207 via the bearing case 225 and the cutting edge holder 205.

3. Scribing Line Forming Mechanism

Figure 3:
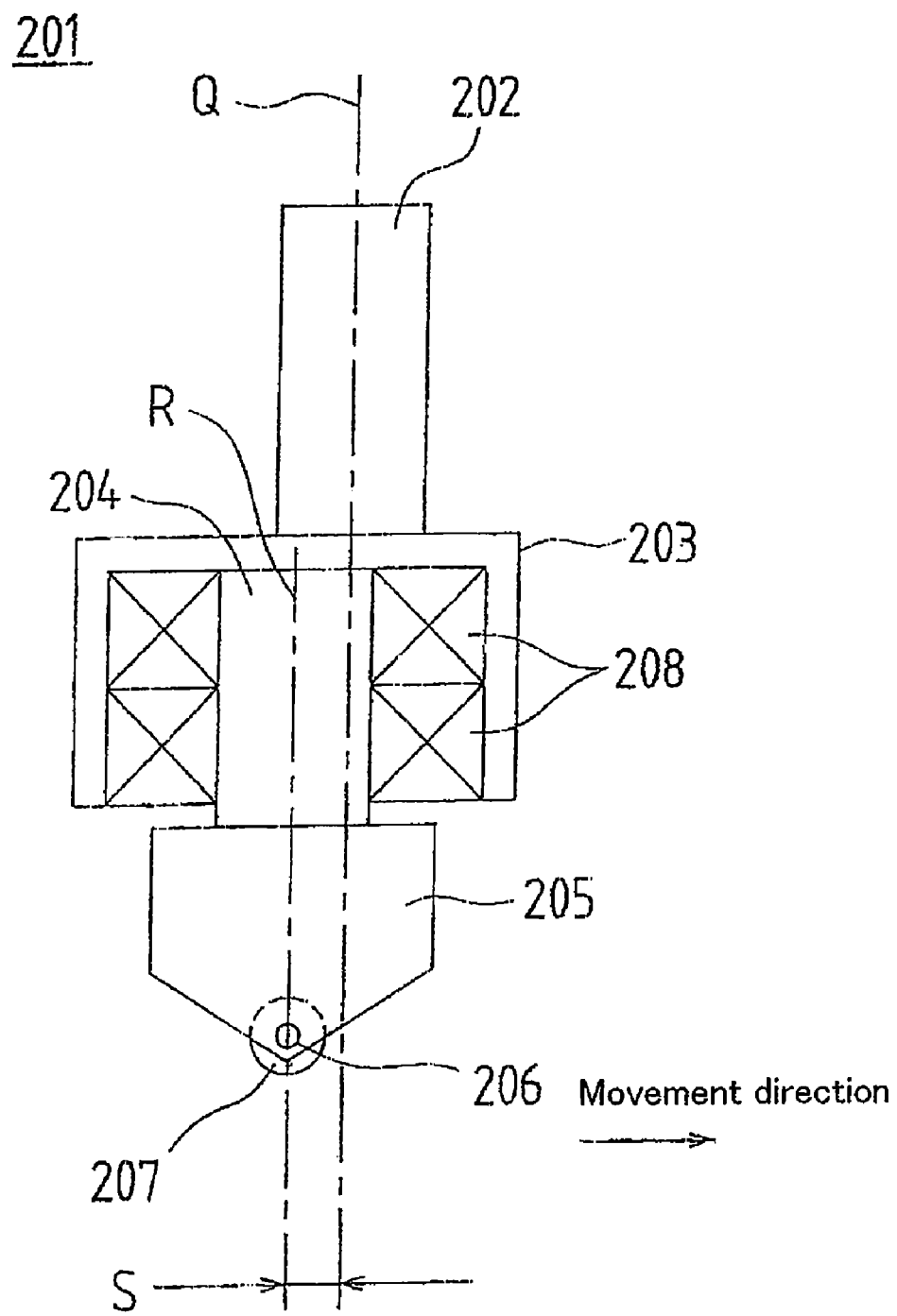
FIG. 3 is a diagram showing the detail of the structure of a scribing line forming mechanism 201.

FIG. 3 shows the detail of the structure of the scribing line forming mechanism 201. The scribing line forming mechanism 201 includes, for example, a cutting edge holder for holding a cutting edge which is pressed onto the substrate G.

Hereinafter, the structure of the scribing line forming mechanism 201 will be described in detail with references to FIG. 2 and FIG. 3. The arrow shown in FIG. 2 and FIG. 3 shows the movement direction of the scribing head 200 and the scribing ling forming mechanism 201 in the scribing step.

The second turning axis 202 is provided on the upper surface of the holder 203. The first turning axis 204 is provided on the holder body 205. The first axle bearing 208 holds the holder body 205 via the first turning axis 204 such that the holder body 205 is turnable in the recessed portion provided at the lower surface of the holder 203.

The scribing line forming means 207 includes, for example, a cutter wheel. The scribing line forming means 207 is structured so as to form a scribing line on the substrate G by contacting the substrate G. The scribing line forming means 207 is axially supported so as to be rotatable via the pin 206 which is provided at the lower portion of the holder body 205.

The first turning axis 204 is provide at the lower surface of the holder 203. An axial center R of the first turning axis 204 is positioned away by the offset distance S from an axial center Q of the second turning axis 202 in a direction opposite to the movement direction (the arrow direction shown in FIG. 3) of the scribing line forming mechanism 201 □ The first turning axis 204 is axially supported by the first axle bearing 208 so as to be rotatable. The first turning axis 204 is provided such that the axial center R of the first turning axis 204 crosses an axial center of the pin 206.

The scribing line forming means 207 is provided such that the contacting point between the scribing line forming means 207 and the substrate G (hereinafter, processing contacting point) is positioned on a line extending from the axial center R of the first turning axis 204. Thus, the scribing line forming mechanism 201 is provided in the scribing head such that the axial center of the first turning axis 204 is approximately vertical to the surface of the substrate G.

Figure 4:
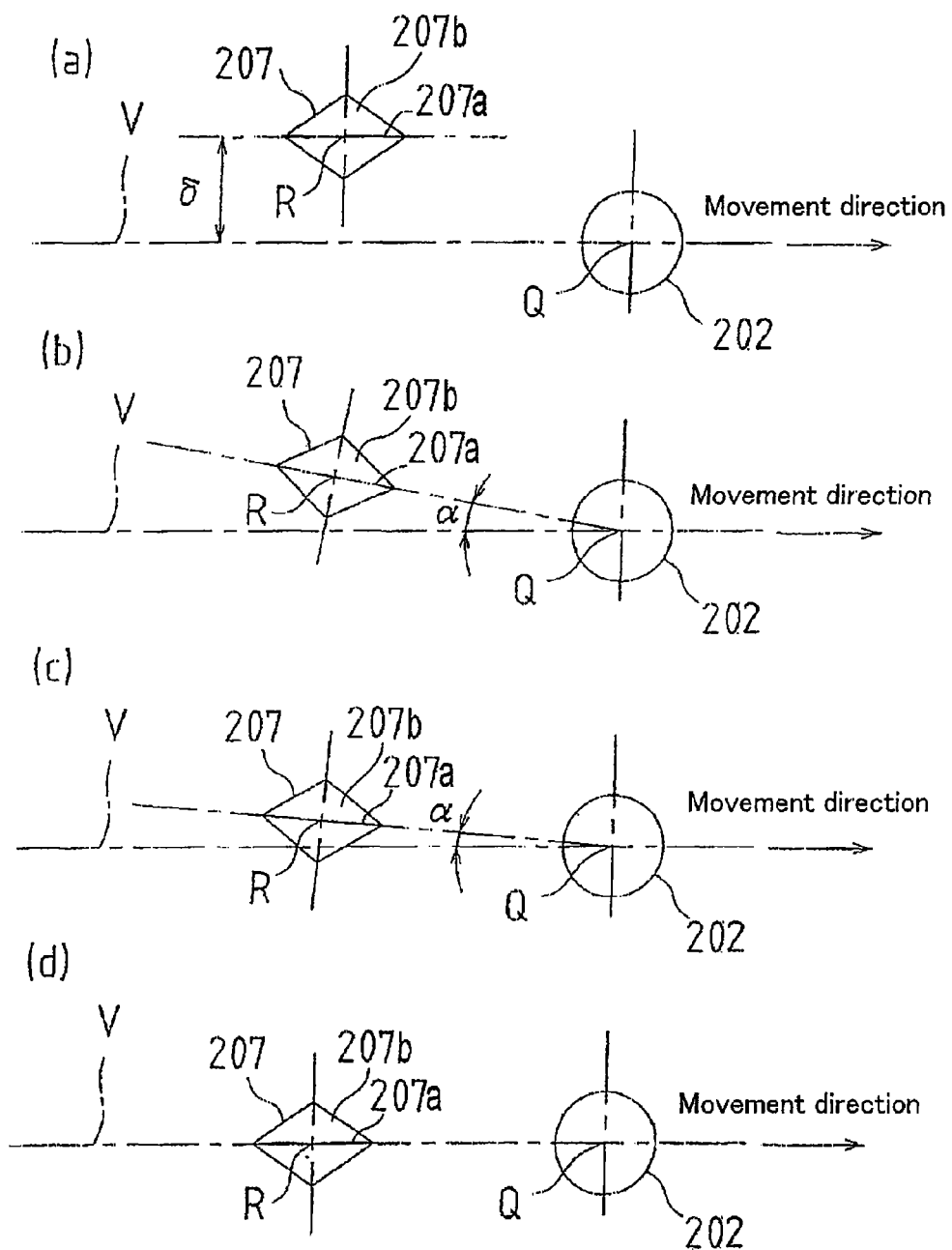
FIG. 4 is a diagram showing a positional relationship between a scribing line forming means 207 and a second turning axis 202 at the time of movement of the scribing head 200.

4. Positional Relationship Between the Scribing Line Forming Means and the Second Turning Axis FIG. 4 shows a positional relationship between the scribing line forming means 207 and the second turning axis 202 at the time of movement of the scribing head 200.

Hereinafter, the transition of the positional relationship between the scribing line forming means 207 and the second turning axis 202 at the time of movement of the scribing head 200 will be described with reference to FIG. 2 to FIG. 4. The substrate G is, for example, a glass substrate.

The scribing line forming mechanism 201 is attached to the scribing head 200. While there is a presence of a slight gap width δ between a cutting edge's ridge 207a of the scribing line forming means 207 and the axial center Q of the second turning axis 202, the scribing line forming means 207 starts forming a scribing line on the substrate G (see FIG. 4(a)).

When the scribing head 200 is moved, a processing reaction force in scribing the substrate G acts on the scribing line forming mechanism 201 via the pin 206. Since the scribing line forming means 207 is provided such that the axial center R of the first turning axis 204 approximately right above the processing contacting point of the scribing line forming means 207 is positioned, the scribing line forming means 207 rotates about the axial center R of the first turning axis 204, and the cutting edge's ridge 207a of the scribing line forming means 207 turns in a direction in which a balance would be obtained for the processing reaction force received by the scribing line forming means 207 at the processing contacting point (see FIG. 4(b)).

Specifically, the direction of line of action on which a pulling force for pulling the scribing line forming means 207 by the scribing head 200 works and the direction of the cutting edge's ridge 207a of the scribing line forming means 207 align with each other. Since the rotating radius is extremely small (the axial center R of the first turning axis 204 and the processing contacting point approximately align with each other), the cutting edge's ridge 207a of the scribing line forming means 207 turns in a direction in which a balance for the processing reaction force would be obtained even if the scribing head 200 is slightly moved.

Furthermore, when the scribing head 200 is moved, the scribing line forming mechanism 201 turns about the axial center Q of the second turning axis 202 anti-clockwise from a state where the cutting edge's ridge 207a of the scribing line forming means 207 is tilted by a slight angle α with respect to the movement path (line V) of axial center Q of the second turning axis 202 (see FIG. 4(b)). Therefore, the angle α between the cutting edge's ridge 207a of the scribing line forming means 207 and the movement path (line V) of the axial center Q becomes smaller (see FIG. 4(c)).

Furthermore, when the scribing head 200 is moved, the processing contacting point moves on the movement path of the axial center Q of the second turning axis 202 (FIG. 4(d)). Thereafter, while a state, in which the cutting edge's ridge 207a of the scribing line forming means 207 and the axial center Q of the second turning axis 202 align with each other, is held, the scribing line forming means 207 continues forming a scribing line (see FIG. 4(d)).

Hereinafter, the operation of the scribing line forming means 201 depends on the magnitude of the change of processing reaction force which acts on the scribing line forming line means 207 with reference to FIG. 2 to FIG. 4. The operation of the scribing line forming means 201 will be described by dividing it into three situations ([Situation 1] to [Situation 3]) shown below.

As a situation in which a processing reaction force changes, for example, there is a situation in which another scribing line is formed so as to cross a previously formed scribing line.

[Situation 1] When the change of the processing reaction force is small.

The scribing line forming means 207 turns about the axial center R of the first turning axis 204, and the cutting edge's ridge 207a of the scribing line forming means 207 turns about a new balanced position. In other words, the scribing line forming mechanism 201 turns in a manner such that the cutting edge's ridge 207a of the scribing line forming means 207 is directed in a line connecting the axial center Q and the processing contacting point of the scribing line forming means 207.

As described with reference to FIG. 4, the axial center R of the first turning axis 204 and the processing contact point approximately align with each other. In other words, the turning radius is extremely small. Thus, even when the scribing head 200 is slightly moved, the scribing line forming means 207 moves to a newly balanced position of a processing reaction force received by the scribing line forming means 207.

[Situation 2] When the change of the processing reaction force is larger than that in Situation 1.

The scribing line forming means 207 moves about the axial center Q of the second turning axis 202 while rotating. Immediately after the movement, the difference between the processing reaction forces received by cutting faces on left and right sides of the scribing line forming means 207 is minimum. Thus, the scribing line forming means 207 moves to the position where the balance of the processing reaction force received by the scribing line forming means 207 is the most stable. Therefore, the scribing line forming means 207 turns about the first turning axis 204, and the scribing line forming mechanism 201 operates in a manner such that a direction of a straight line which connects the processing contacting point and the axial center Q of the second turning axis 202 and a rotating movement direction of the cutting edge's ridge 207a of the scribing line forming means 207 align with each other. Thus, a scribing situation in Situation 2 is the same as the one in Situation 1.

[Situation 3] When the processing reaction force does not change.

Similar to the caster effect in the case of δ=0, the cutting edge's ridge 207a of the scribing line forming means 207 moves closer to the movement path of the axial center Q while the scribing line forming mechanism 201 is turning about the axial center Q of the second turning axis 202.

As described above, when a scribing is performed by the scribing head 200, in the case of [Situation 1], a balance of the processing reaction force at the contacting point between the scribing line forming means 207 and the substrate G is promptly obtained, based on the turning movement of the scribing line forming mechanism 201, and an operation resulting from the caster effect similar to in the case of δ=0 is immediately started. Thus, compared to the case in which a conventional scribing head is used, the magnitude of the meandering can be suppressed.

Additionally, in the case of [Situation 2], the direction of the scribing line forming means 207 is changed in a manner such that a load balance received by the scribing line forming means 207 becomes the most stable immediately after the processing contacting point is moved, and the time to be required such that the turning movement direction of the cutting edge's ridge 207a of the scribing line forming means 207 is caused to align with the running direction of the scribing head 200 is short. Thus, compared to a conventional scribing head, a meandering distance and a meandering time are shortened. Furthermore, even after the scribing line forming means 207 is back to the movement path of the axial center Q, the rolling movement direction of the cutting edge's ridge 207a of the scribing line forming means 207 overlaps the movement direction of the scribing head 200 (i.e., the movement direction of axial center Q). Thus, even in the case of δ≠0 (i.e., there is a gap width resulting from an error such as a processing), if the scribing step is performed by using the scribing head 200, it is possible to continue a stable scribing operation similar to the case in which the scribing head is when δ=0.

It is difficult to make the gap width δ zero in view of processing accuracy, cost and mounting accuracy. However, according to the scribing line forming mechanism, the scribing head and the scribing apparatus of the present invention, even in the case where a scribing is performed by using a scribing line forming mechanism with which the gap width δ is not zero, at least one of the scribing line forming mechanism 201 and the scribing line forming means 207 turns in a direction in which the direction of the cutting edge's ridge 207a of the scribing line forming means 207 becomes immediately stable corresponding to the change of the processing reaction force. Thus, even when a large change is received, the caster effect, similar to the case where the gap width δ is zero, at the time of scribing operation can be obtained. As a result, it is not necessary to pay much attention to the precision of the processing accuracy, the mounting accuracy, and making the gap width δ zero. Therefore, there is an advantage in that the cost for manufacturing a scribing line forming mechanism can be reduced.

Furthermore, even when the gap width δ is not zero, the turning movement direction of the cutting edge's ridge 207a of the scribing line forming means 207 aligns with the running direction of the scribing head while the scribing line forming means 207 receives a normal stable processing reaction force. Thus, an excellent scribing operation with a stable straightness is obtained.

In the Embodiment, the case has been described in which the scribing line forming means 207 starts scribing at a position, which is deviated by the gap width δ on the left side (on the upper side in FIG. 4) in the moving direction of axial center Q of the second turning axis 202, as a starting point. However, even when the scribing line forming means 207 starts scribing at a position, which is deviated by the gap width δ on the right side (on the lower side in FIG. 4) in the moving direction of axial center Q of the second turning axis 202, as a starting point, a similar effect can be obtained.

According to the scribing head 200 of the Embodiment of the present invention, a scribing line with a high degree of straightness can be formed on the substrate G.

Furthermore, according to the scribing line forming mechanism, the scribing head and the scribing apparatus of the present invention, even when there is a gap width δ between the cutting edge's ridge 207a of the scribing line forming means 207 and the axial center Q of the second turning axis 202, the cutting edge's ridge 207a of the scribing line forming means 207 turns in a direction so as to overlap on a line of action on which the pulling force of the scribing head acts immediately after the starting of movement of the scribing head 200. Therefore, the scribing line forming means 207 rolls in a manner such that a gap angle γ of the cutting edge's ridge 207a of the scribing line forming means 207 with respect to the movement path line of the axial center Q of the second turning axis 202 (see FIG. 21(b)) promptly comes close to 0, and the cutting edge's ridge 207a of the scribing line forming means 207 moves closer to the movement path line of the axial center Q. In this manner, along with the movement of the scribing head 200, the scribing line forming means 207 reaches the position where it overlaps the movement path of the axial center Q of the second turning axis 202 owing to the acting caster effect, thereby a stable scribing operation being performed.

As described above, the scribing line forming mechanism, the scribing head and the scribing apparatus according to the Embodiment of the present invention has been described with reference to FIG. 1 to FIG. 4.

In the examples shown in FIG. 1 to FIG. 3, the scribing line forming mechanism 201 corresponds to a "scribing line forming mechanism", the scribing line forming means 207 corresponds to a "scribing line forming means being structured so as to form a scribing line on a substrate by contacting the substrate", the holder body 205 corresponds to a "supporting means for supporting the scribing line forming means such that the scribing line forming means is turnable about a first turning axis, the supporting means being structured so as to be turnable about a second turning axis, the second turning axis being different from the first turning axis", the first turning axis 204 corresponds to a "first turning axis", and the second turning axis 202 corresponds to a "second turning axis". Furthermore, the scribing head 200 corresponds "a scribing head", and the energizing means 230 corresponds "a pressure application means for applying a pressure force to the scribing line forming mechanism in order to press the scribing line forming means onto the substrate". the Furthermore, the scribing apparatus 100 corresponds to a "scribing apparatus", and the first motor 116 corresponds to a "moving means for moving the scribing head on a surface, the surface being approximately parallel to the substrate, such that the scribing line forming means forms the scribing line on the substrate".

However, the scribing line forming mechanism, the scribing head and the scribing apparatus according to the Embodiment of the present invention are not limited to those shown in FIG. 1 to FIG. 3. A scribing line forming mechanism, a scribing head and a scribing apparatus having arbitrary structure can be included in the scope of the present invention as long as the function of each means described above is achieved.

Furthermore, each means described in the Embodiment shown in FIG. 1 to FIG. 3 can be implemented by hardware, software or the combination of the hardware and the software.

5. Scribing Line Forming Process Procedure

Figure 5:
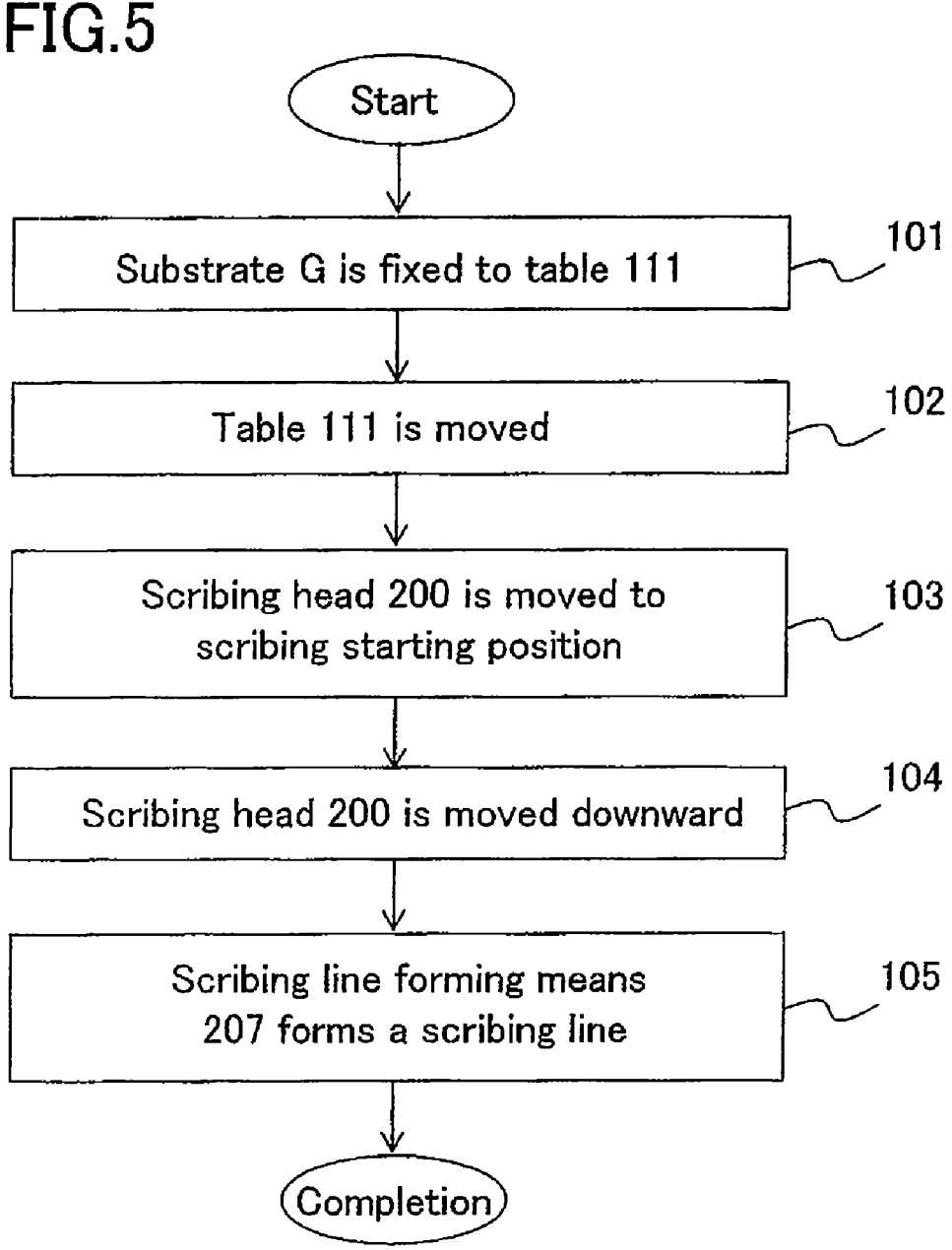
FIG. 5 is a flowchart showing a scribing line forming process procedure for forming a scribing line on a substrate G.

FIG. 5 show a scribing line forming process procedure for forming a scribing line on a substrate G. Hereinafter, the scribing line forming process procedure according to the present invention will be described step by step with reference to FIG. 1, FIG. 2 and FIG. 5. The scribing line forming process procedure is performed by a scribing apparatus 100.

Step 101: When a table 111 is mounted on the substrate G, a vacuum adsorption means fixes the substrate G to the table 111.

Step 102: When a first CCD camera 118A and a second CCD camera 118B identify an alignment mark inscribed on the substrate G, the mounting position of the substrate G is detected and the table 111 is moved such that the mounting position of the substrate G is a desired position.

For example, if it is detected that the mounting position of the substrate G is deviated from the desired position by the angle θ about the turning axis of the table 111, the table 111 is rotated by the angle −θ about the turning axis of the table 111.

For example, if it is detected that the mounting position of the substrate G is deviated from the desired position by a distance a in the Y-direction, the table 111 is moved by a distance −a in the Y-direction.

After the mounting position of the substrate G is moved to the desired position, the process proceeds to step 103.

Step 103: When a first motor 116 is driven, a sliding unit 115 (scribing head 200) is moved along a guide bar 114 to a scribing starting position. For example, the sliding unit 115 is moved such that the scribing line forming means 207 is positioned in the vicinity of the outside of the left end face of the substrate G (see FIG. 1).

After the sliding unit 115 is moved to the scribing starting position, the process proceeds to step 104.

Step 104: When a second motor 117 is driven, the scribing head 200 moves downward until the scribing line forming means 207 reaches the position which is located at a predetermined depth below the surface of the substrate G (e.g., position of 0.05 mm to 0.20 mm below the surface of the substrate G).

After the scribing line forming means 207 reaches the position which is located at the predetermined depth below the surface of the substrate G, the process proceeds to step 105.

Step 105: While a predetermined load is applied to the scribing line forming means 207 by an energizing means 230, the first motor 116 moves the sliding unit 115 along the guide bar 114. The scribing head 200 moves along with the movement of the sliding unit 115, and the scribing line forming means 207 forms a scribing line.

After the scribing line forming means 207 has formed the scribing line, the process is completed.

As described above, the scribing line forming means process procedure according to the Embodiment of the present invention has been described above with reference to FIG. 1, FIG. 2 and FIG. 5.

6. Gear-Type Scribing Head

Figure 6:
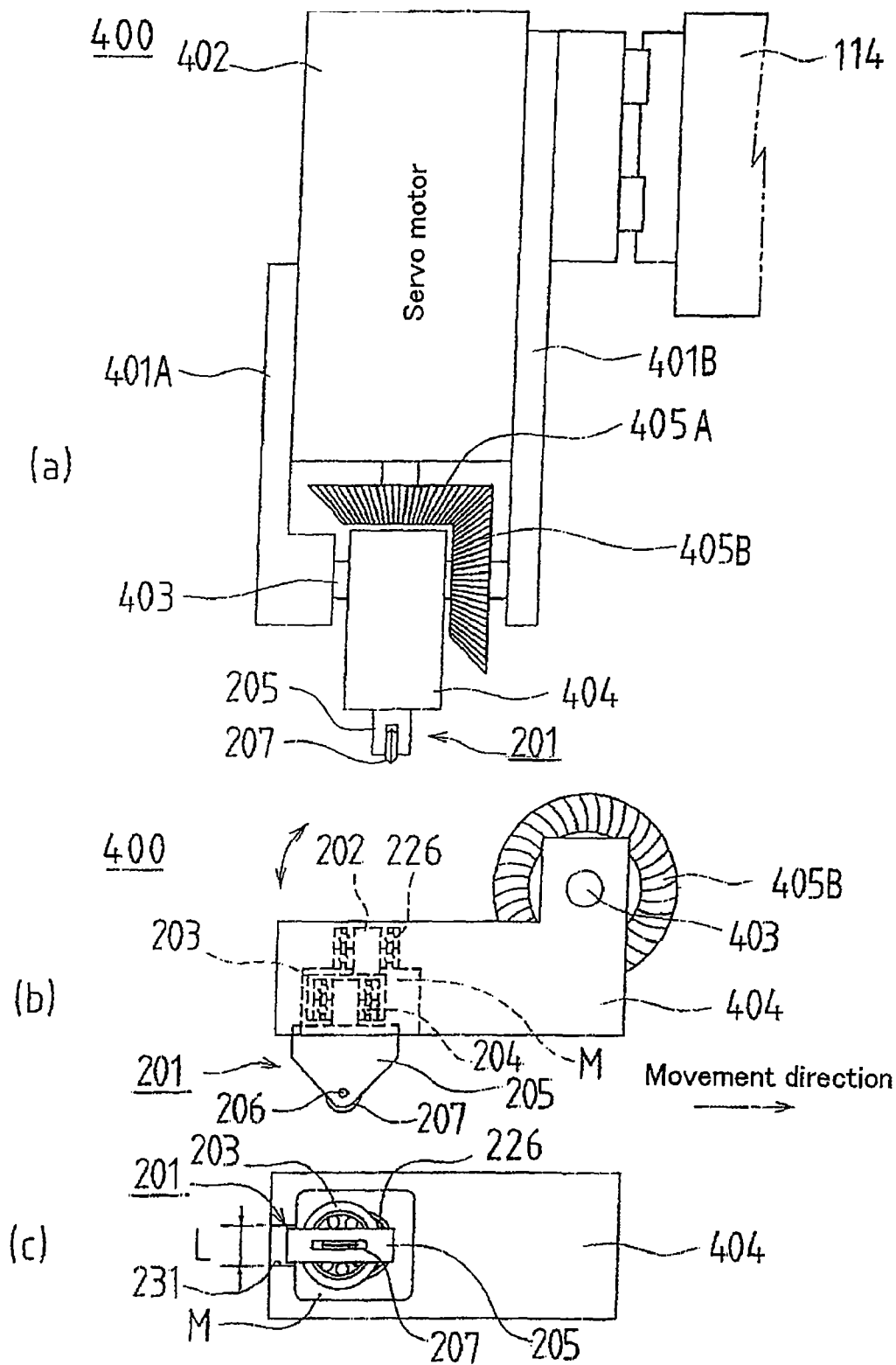
FIG. 6 is a diagram showing a structure of a gear-type scribing head 400 which is another example of the scribing head.

FIG. 6 shows a structure of a gear-type scribing head 400 which is another example of the scribing head. FIG. 6(a) shows a side view of the gear-type scribing head 400. FIG. 6(b) shows a front view of relevant parts of the gear-type scribing head 400. FIG. 6(c) shows a bottom of relevant parts of the gear-type scribing head 400. In FIG. 6, the same components as those shown in FIG. 2 are denoted by the same reference numerals, and the description thereof will be omitted.

The gear-type scribing head 400 includes a first side wall 401A, a second side wall 401B, a servo motor 402 which is fixed between the first side wall 401A and the second side wall 401B in an upside down manner, an L-shaped holder holding member 404, a spindle 403, which is provided at the bottom portion of the first side wall 401A and the second side wall 401B, for supporting the holder holding member 404 such that the holder holding member 404 is rotatable, and a scribing line forming mechanism 201.

A first bevel gear 405A is firmly fixed to an output axis of the servo motor 402. A second bevel gear 405B is firmly fixed to the spindle 403. The first bevel gear 405A and the second bevel gear 405B are provided so as to engage with each other. Thus, when the servo motor 402 is rotated in a positive direction or a negative direction, the holder holding member 404 turns about the spindle 403, and the scribing line forming mechanism 201 moves upward or downward, respectively.

The gear-type scribing head 400 is provided on the guide bar 114 so as to be slidable. A recessed portion M is formed at the lower surface of the holder holding member 404 such that the holder 203 can be inserted therein. An insertion opening is formed in the back of the recessed portion M. The insertion opening is used for inserting a bearing attached to the second turning axis 202 therein. The second turning axis 202 is inserted into the bearing insertion opening at the lower surface of the bearing case 225 via the bearing.

A groove 231 having a width L is formed at the lower surface of the holder holding member 404. A portion of the holder body 205 is embedded in the groove 231. The turning of the scribing line forming mechanism 201 is restricted by the range of the width L of the groove 231.

The gear-type scribing head 400 moves the scribing line forming means 207 upward and downward by controlling the position of the servo motor 402 and determines the position of the scribing line forming means 207. When the position of the scribing line forming means 207 set by the servo motor 402 is deviated in the X-direction, the driving torque, which works so as to move the scribing line forming means 207 back to the position of the scribing line forming means 207 set by the servo motor 402, is restricted, and at the same time, the driving torque is transmitted to the scribing line forming means 207 as a scribing pressure.

The gear-type scribing head 400 can be applied to the scribing apparatus 100 which has been described with reference to FIG. 1, instead of the scribing head 200 or in addition to the scribing head 200 which has been described with reference FIG. 2. The scribing apparatus 100 including the gear-type scribing head 400 can perform the scribing line forming process procedure which has been described with reference to FIG. 5.

Figure 7:
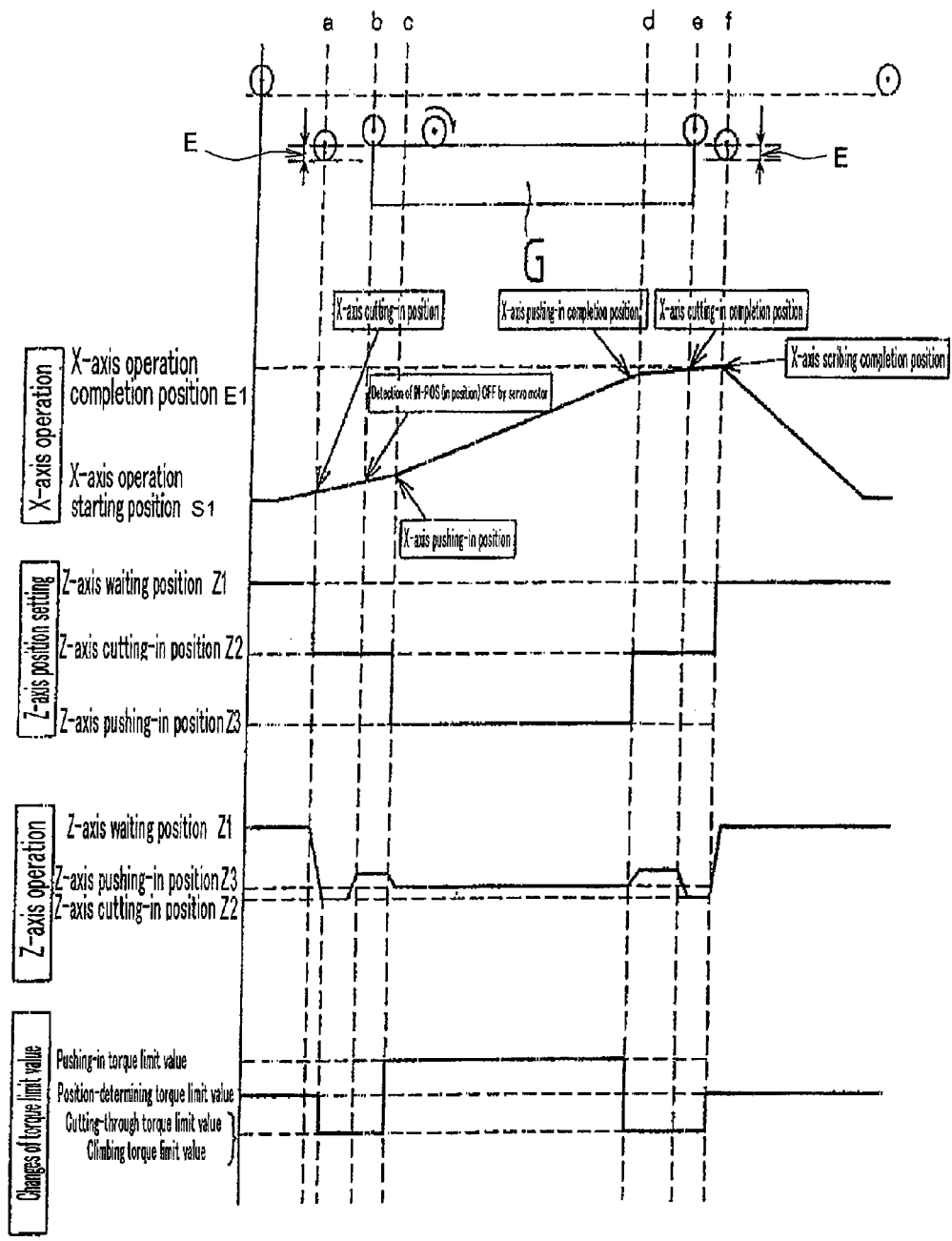
FIG. 7 is a diagram showing a controlling process procedure for controlling the gear-type scribing head 400.

FIG. 7 shows a controlling process procedure for controlling the gear-type scribing head 400. Hereinafter, the controlling process procedure for controlling the scribing head 400 in order to scribe the substrate G by the gear-type scribing head 400 will be described with reference to FIG. 7.

Specifically, FIG. 7 shows a timing-chart of the operation of the scribing line forming means 207 for forming one scribing line. Categories are: an X-axis operation (operation in which the scribing head 400 moves on the substrate); a Z-axis position setting (setting position of the scribing line forming means 207 in a vertical direction); a Z-operation (operation in which the scribing line forming means 207 moves in the vertical direction); and changes of a torque limit value (changes of the torque limit value of the servo motor 402).

An example, in which the scribing line forming means 207 moves from the left (position a) to the right (position f) on the substrate G in order to scribe in a direction which the positional data in the X-axis increases, is shown. In the example which will be described with reference to FIG. 7, the torque of the servo motor 402 is limited based on the position data in the X-axis.

First, the position data in the X-axis is set in a control section which is included in the gear-type scribing head 400. The position data in the X-axis includes: data showing an X-axis cutting-in position (position a); data showing an X-axis pushing-in position (position c); data showing an X-axis pushing-in completion position (position d); data showing an X-axis cutting-in completion position (position e); and data showing an X-axis scribing completion position (position f). The X-axis cutting-in position (position a), the X-axis pushing-in position (position c), the X-axis pushing-in completion position (position d), the X-axis cutting-in completion position (position e) and the X-axis scribing completion position (position f) exist between an X-axis operation starting position (position S1) and an X-axis operation completion position (position E1).

After the position data in the X-axis is set in the control section, the process proceeds to step 1.

Step 1: In the operation of the scribing line forming means 207 for forming one scribing line, a position-determining torque value is output. After the position-determining torque value is output, the process proceeds to step 2.

Step 2: The scribing line forming means 207 is moved to a Z-axis waiting position (position Z2). After the scribing line forming means 207 is moved, the process proceeds to step 3.

Step 3: At the time when the scribing line forming means 207 has moved to the X-axis cutting-in position (position a), the scribing line forming means 207 moves to a Z-axis cutting-in position (position Z2), and the position along the Z-axis of the scribing line forming means 207 is held. The Z-axis cutting-in position (position Z2) is a position where the scribing ling forming means 207 has moved downward by E from point 0 (surface of the substrate G) in the vertical direction. After the position is held, the process proceeds to step 4.

Step 4: A climbing torque limit value is set, and the servo motor 402 outputs the climbing torque limit value. In other words, when the scribing line forming means 207 moves in the horizontal direction and climbs the substrate G (position b), the position of the scribing line forming means 207 in the Z-axis cutting-in position is deviated. Thus, while IN-POS (in position) signal output from a servo amplifier is ON, the servo motor 402 tries to move the position of the scribing line forming means 207 back to the original Z-axis cutting-in position and increases the torque, thereby causing the need for limiting the climbing torque. Therefore, the climbing torque limit value is set. The climbing torque limit value is a small value such that a chip does not occur at the end of the substrate G when the scribing line forming means 207 climbs the substrate G.

Step 5: When the scribing line forming means 207 has climbed the substrate G (position b), the position of the scribing line forming means 207 of the Z-axis cutting-in position is deviated. When the IN-POS (in position) signal output from the servo amplifier is OFF, a pushing torque limit value is set at position c by a controller which issues an instruction to the servo motor (e.g., NC or sequencer) after the scribing line forming means 207 has moved by a preset predetermined distance. The servo motor 402 outputs the pushing torque limit value. If the setting position in the Z-axis remains to be the Z-axis cutting-in position, a displacement is small, and an appropriate pushing torque for scribing cannot be obtained. Thus, the setting position in the Z-axis is set at the Z-axis pushing position which is further below the Z-axis cutting-in position from the upper surface of the substrate G.

Step 6: The gear-type scribing head 400 is moved to the X-direction (position d) at a preset scribing speed by using the driving torque (which is limited to the pushing torque limit value) for trying to move to the Z-axis pushing position as a scribing pressure. When the gear-type scribing head 400 has reached position d, the process proceeds to step 7.

Step 7: The scribing speed is decreased to a cutting-through speed which can cut the substrate G. The cutting-through speed is preset. A cutting-through torque limit value is set. The servo motor 402 outputs the cutting-through torque limit value. The position in the Z-axis is set as the Z-axis cutting-in position. The cutting-through torque limit value is set as a small value as in the case of climbing such that a chip does not occur at the end of the substrate G when the scribing line forming means 207 is cutting through the substrate G (X-axis cutting-in completion position, position e).

Step 8: When the scribing line forming means 207 has cut through the substrate G (position e), the position of the scribing line forming means 207 in the vertical direction again returns to the Z axis cutting-in position.

Step 9: When the gear-type scribing head 400 has reached position f, a position-determining torque is set, and the servo motor outputs the position-determining torque value. Then, the scribing line forming means 207 once again moves to the Z-axis waiting position. A series of scribing operations is completed.

When a scribing line is formed on the substrate G by the gear-type scribing head 400, as previously described, the cutting edge's ridge 207a of the scribing line forming means 207 holds the position which overlaps the movement path of the axial center Q of the second turning axis 202 run by the gear-type scribing head 400. Therefore, a scribing line with a high degree of straightness is formed.

When the servo motor 402 is rotatingly driven, it is possible to move the scribing line forming means 207 upward and downward via the holder holding member 404. Thus, it is possible to directly act the rotating torque as a scribing pressure via the servo motor 402, and a scribing pressure appropriate for the substrate G can be arbitrarily selected.

7. Direct-Coupled-Type Scribing Head

Figure 8:
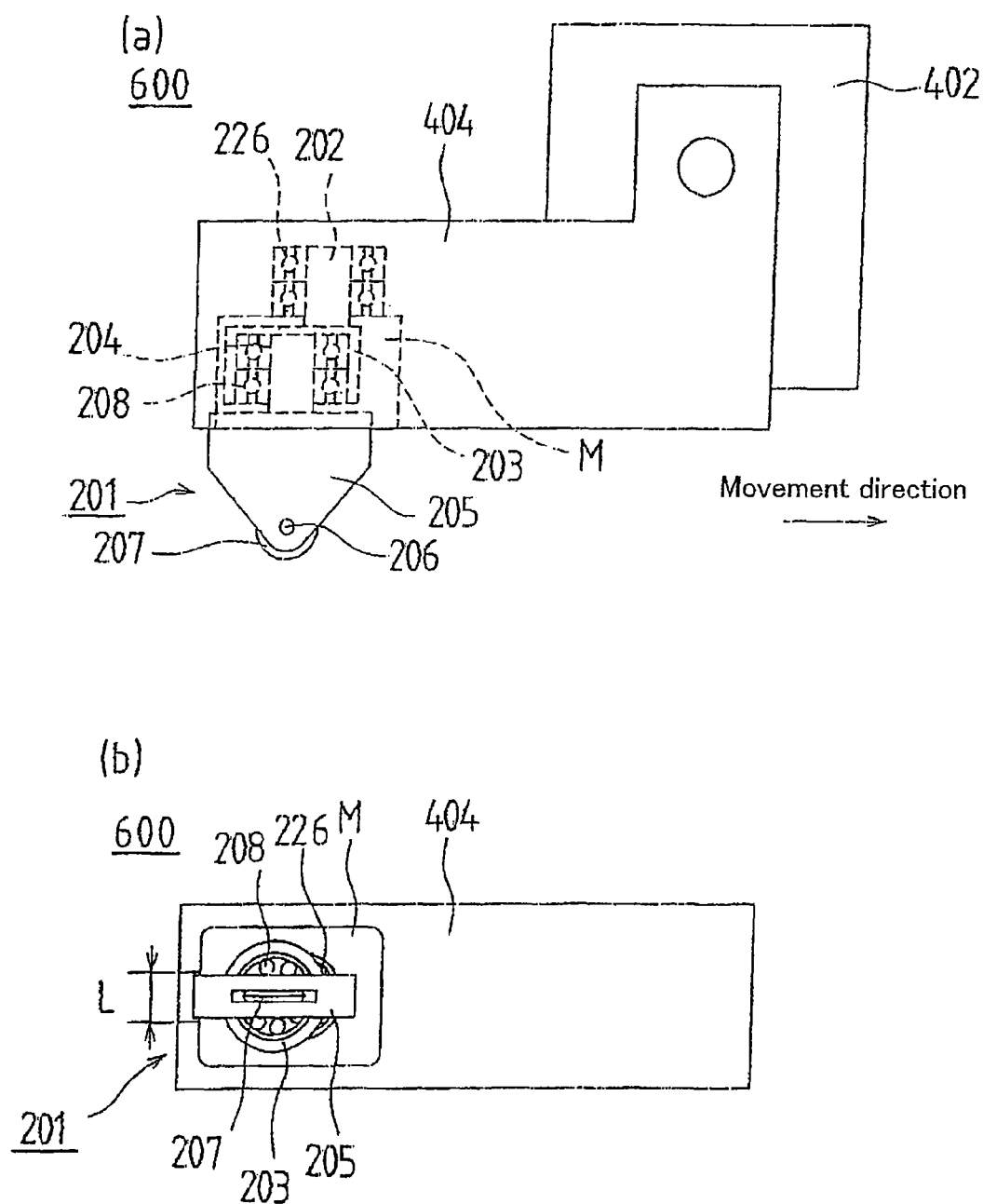
FIG. 8 is a diagram showing a structure of a direct-coupled-type scribing head 600 which is another example of the scribing head.

FIG. 8 shows a structure of a direct-coupled-type scribing head 600 which is another example of the scribing head. FIG. 8(a) shows a side view of the direct-coupled-type scribing head 600. FIG. 8(b) shows a bottom view of the direct-coupled-type scribing head 600. In FIG. 8, the same components as those shown in FIG. 2 and FIG. 6 are denoted by the same reference numerals, and the description thereof will be omitted.

The holder holding member 404 is directly coupled to an output axis of the servo motor 402. Since the holder holding member 404 is directly coupled to the output axis of the servo motor 402, the responsiveness of the servo motor 402 is further increased. Furthermore, since a rotating torque of the servo motor 402 is directly used as a scribing pressure, a scribing pressure appropriate for the substrate G can act on the substrate G by adjusting the rotating torque in a non-stepwise manner.

The direct-coupled-type scribing head 600 can be applied to the scribing apparatus 100 which has been described with reference to FIG. 1, instead of the scribing head 200 or in addition to the scribing head 200 which has been described with reference FIG. 2. The scribing apparatus 100 including the direct-coupled-type scribing head 600 can perform the scribing line forming process procedure which has been described with reference to FIG. 5 and FIG. 7.

8. Cylindrical Cam-Type Scribing Head

Figure 9:
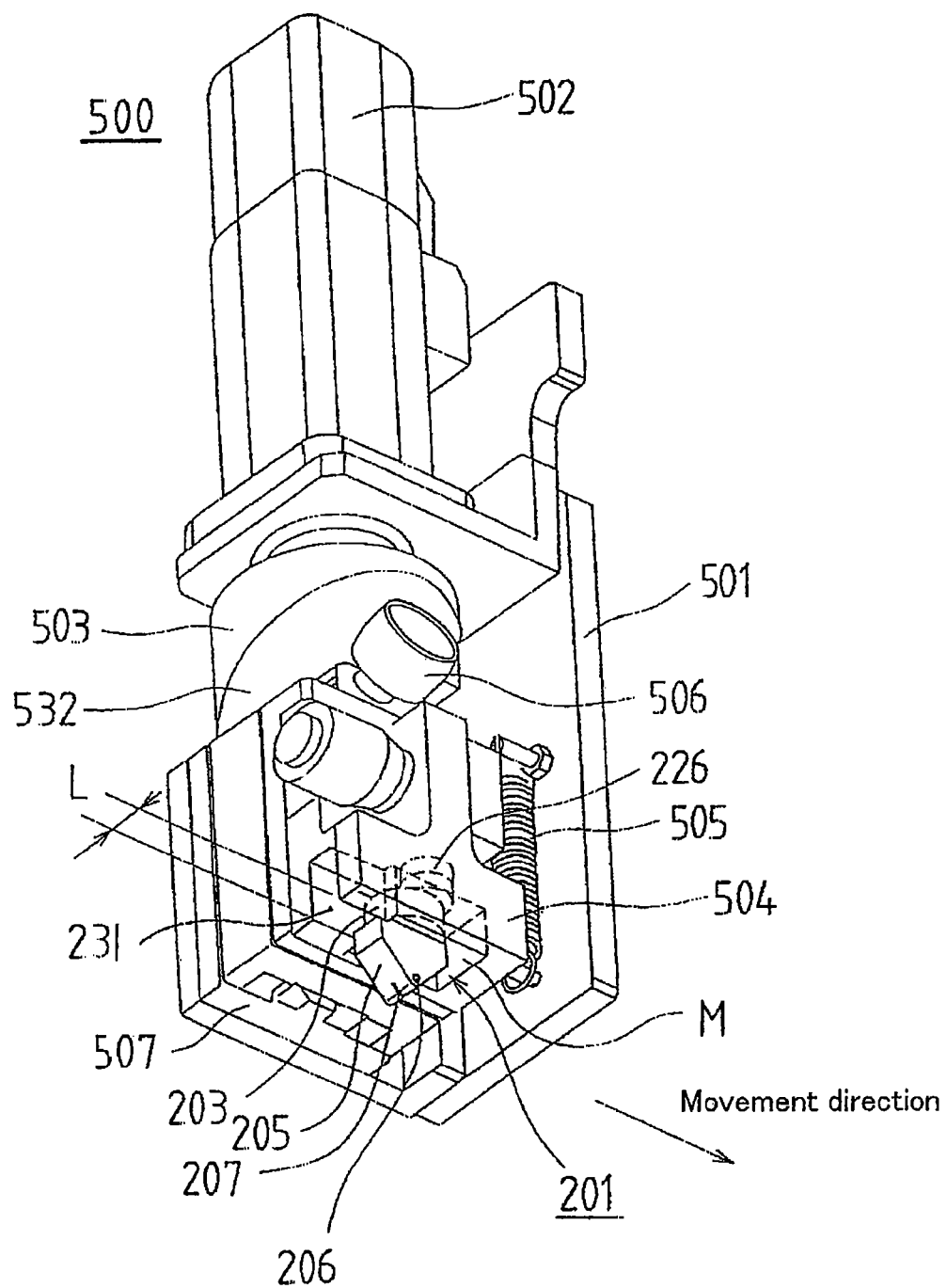
FIG. 9 is a diagram showing a structure of a cylindrical cam-type scribing head 500 which is another example of the scribing head.

FIG. 9 shows a structure of a cylindrical cam-type scribing head 500 which is another example of the scribing head. In FIG. 9, the same components as those shown in FIG. 2 are denoted by the same reference numerals, and the description thereof will be omitted.

The cylindrical cam-type scribing head 500 includes a servo motor 502, a cylindrical cam 503, a bearing 506, a holder holding member 504, a linear bearing 507 and a scribing line forming mechanism 201. The servo motor 502 is fixed to a side wall 501 in an upside down manner. The cylindrical cam 503 is connected to the output axis of the servo motor 502. The bearing 506 is axially supported so as be rollable on a cam face 532 of the cylindrical cam 503. The holder holding member 504 axially supports the bearing 506 such that the bearing 506 is rotatable. Additionally, the holder holding member 504 is energized in a direction toward the cylindrical cam 503 via an elastic member 505. The linear bearing 507 is fixed to the side wall 501 and fits the holder holding member 504 by insertion in a manner such that the linear bearing 507 can move the holder holding member 504 upward and downward. The scribing line forming mechanism 201 has a second turning axis 202 axially supported such that the second turning axis 202 is turnable on a lower surface of the holder holding member 504.

A recessed portion M is formed at the lower surface of the holder holding member 504 such that the holder 203 can be inserted therein. An insertion opening is formed in the back of the recessed portion M. The insertion opening is used for inserting a bearing attached to the second turning axis 202 therein. The second turning axis 202 is inserted into the bearing insertion opening at the lower surface of the bearing case 225 via the bearing.

A groove 231 having a width L is formed at the lower surface of the holder holding member 504. A portion of the holder body 205 is embedded in the groove 231. The turning of the scribing line forming mechanism 201 is restricted by the range of the width L of the groove 231.

While the cutting edge's ridge 207a of the scribing line forming means 207 holds the position which overlaps the movement path of the axial center Q of the second turning axis 202 run by the gear-type scribing head 500, a scribing line is formed. Therefore, the scribing line which has been formed has a high degree of straightness.

The servo motor 502 rotates the cylindrical cam 503 by a positive direction or a negative direction. Thus, it is possible to move the holder holding member 504 upward and downward along the linear bearing via the bearing 506. As a result, the scribing line forming mechanism 201 can be moved upward and downward.

According to the cylindrical cam-type scribing head 500, the cylindrical cam 503 is rotated by rotatingly driving the servo motor 502, thereby moving the holder holding member 504 via the bearing 506. Thus, the position of the holder holding member 504 smoothly changes having a cosine curve. As a result, compared to the scribing head 400 (see FIG. 6) and the scribing head 600 (see FIG. 8) which change the position of the holder holding member 404 in a straight line manner, the position of the cylindrical cam-type scribing head 500 can change with a smaller amount of force, and an excellent following capability of the scribing line forming means 207 for undulations on the surface of the substrate G can be obtained.

Furthermore, according to the cylindrical cam-type scribing head 500, it is possible to move the scribing line forming mechanism 201 of the scribing head 500 upward and downward in a straight line manner. Thus, compared to the case in which the scribing line forming mechanism 201 is provided in the bearing case 205 and the holder holding member 404, the change of the torque to be transmitted to the scribing line forming means 207 is small. Furthermore, the speed of moving the scribing line forming mechanism 201 upward and downward does not change.

Furthermore, the number of components that make up the cylindrical cam-type scribing head 500 is small and the mounting thereof is easy.

Furthermore, according to the cylindrical cam-type scribing head 500, since the structure of the scribing head can be compact, there is an advantage that it can be accommodated in a small footprint space.

The cylindrical cam-type scribing head 500 can be applied to the scribing apparatus 100 which has been described with reference to FIG. 1, instead of the scribing head 200 or in addition to the scribing head 200 which has been described with reference FIG. 2. The scribing apparatus 100 including the cylindrical cam-type scribing head 500 can perform the scribing line forming process procedure which has been described with reference to FIG. 5 and FIG. 7.

9. Regarding the Turning Restriction of the Scribing Line Forming Mechanism

As described with reference to FIG. 2, FIG. 6, FIG. 8 and FIG. 9, in the scribing head 200, the scribing head 400, the scribing head 600 and the scribing head 500, the turning about the first turning axis 204 and the second turning axis 202 of the scribing line forming mechanism 201 is restricted. Specifically, a recessed portion M and a groove 231 are formed at the lower surface of the bearing case 225, the holder holding member 404 and the holder holding member 504 such that the holder 203 can be inserted into the recessed portion M and the groove 231, and a portion of the holder body 205 is embedded into the groove 231. Thus, the turning of the scribing line forming mechanism 201 is restricted by the groove 231.

However, the turning about the first turning axis 204 and the second turning axis 202 of the scribing line forming mechanism 201 is not limited to be restricted.

Figure 10:
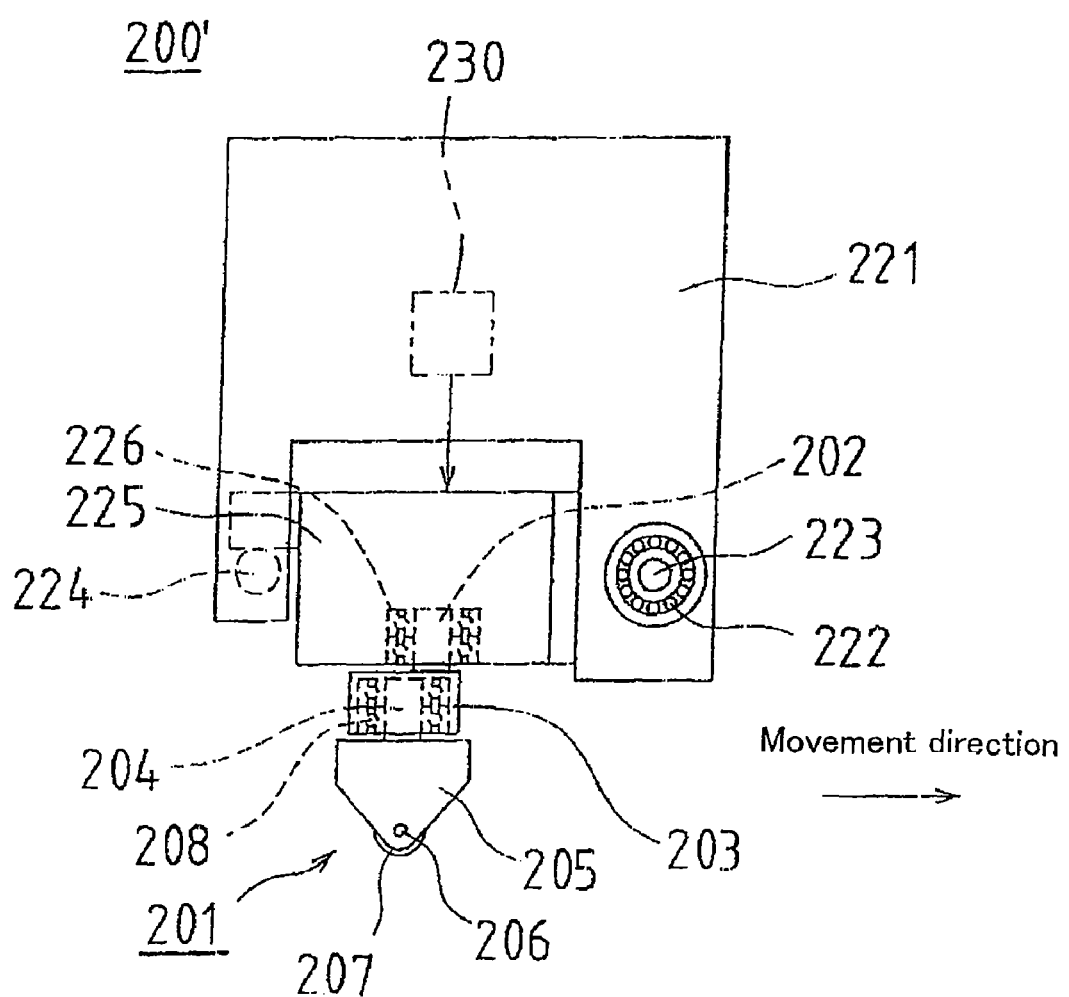
FIG. 10 is a diagram showing a structure of a scribing head 200' which is another example of the scribing head.
Figure 11:
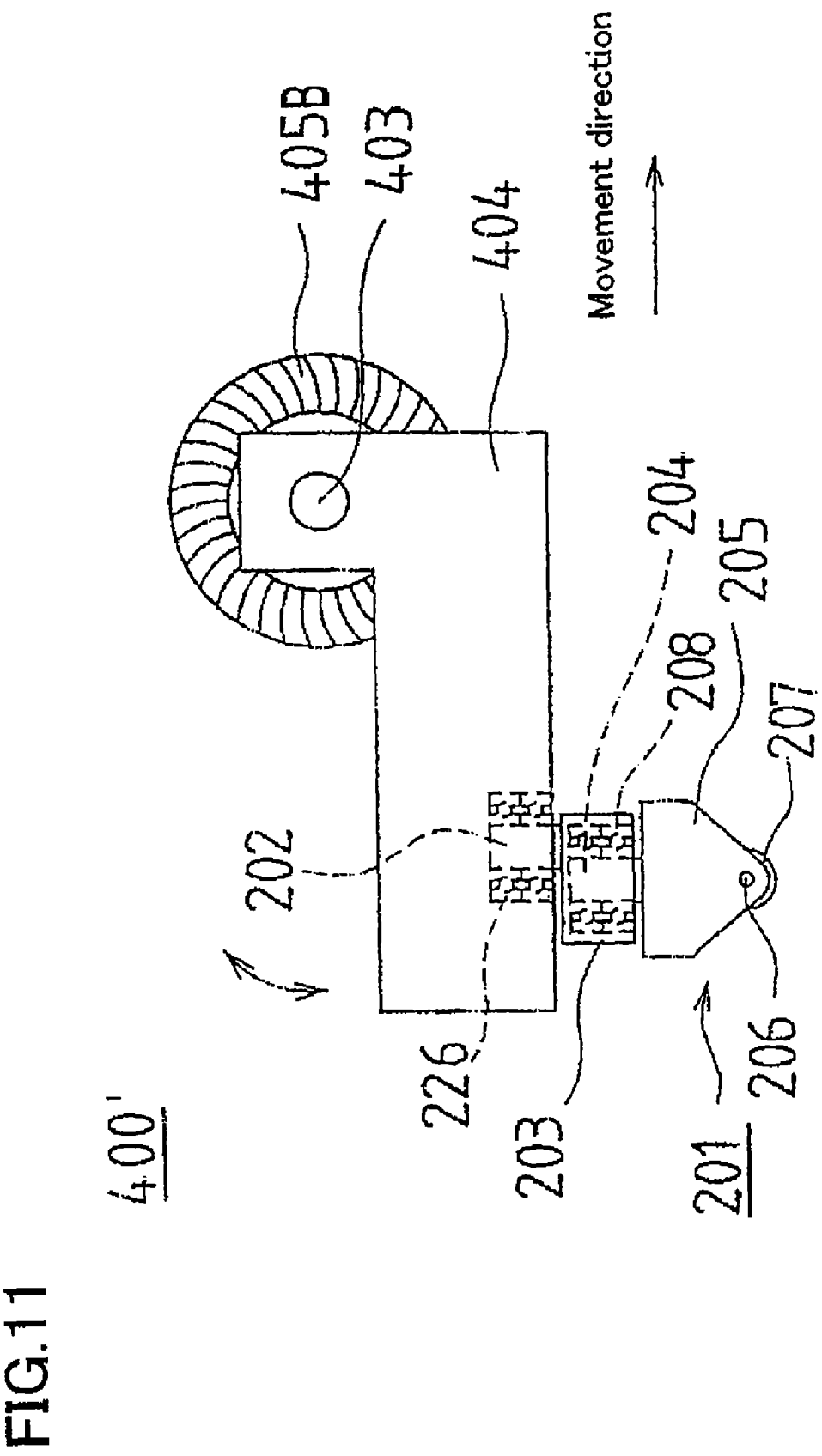
FIG. 11 is a diagram showing a structure of a scribing head 400' which is another example of the scribing head.
Figure 12:
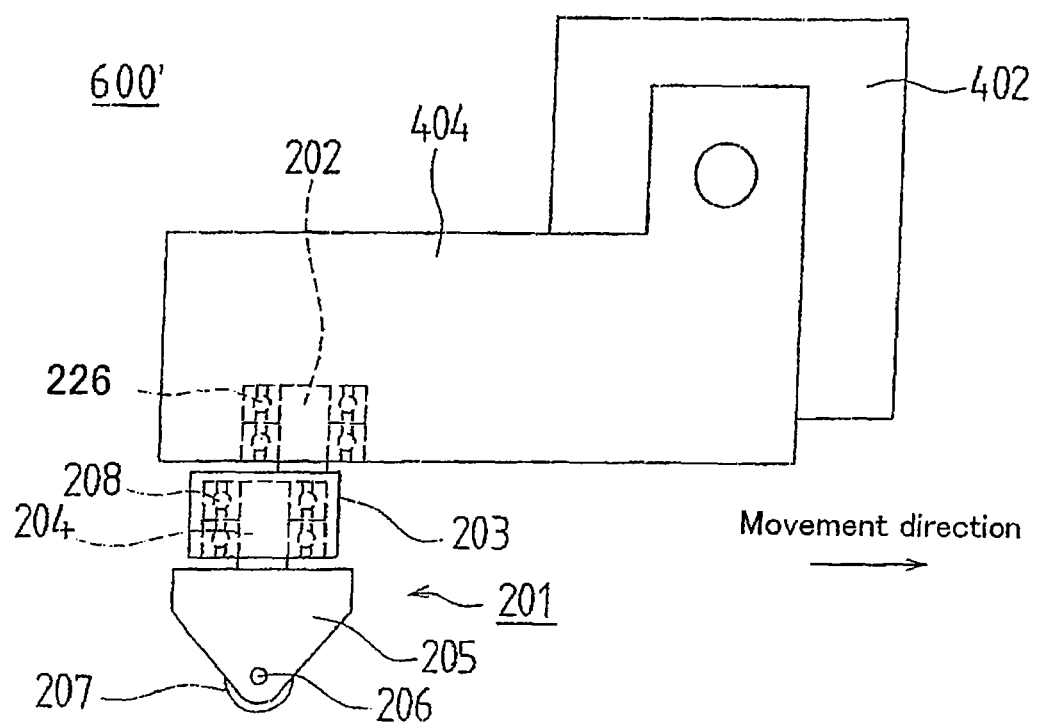
FIG. 12 is a diagram showing a structure of a scribing head 600' which is another example of the scribing head.
Figure 13:
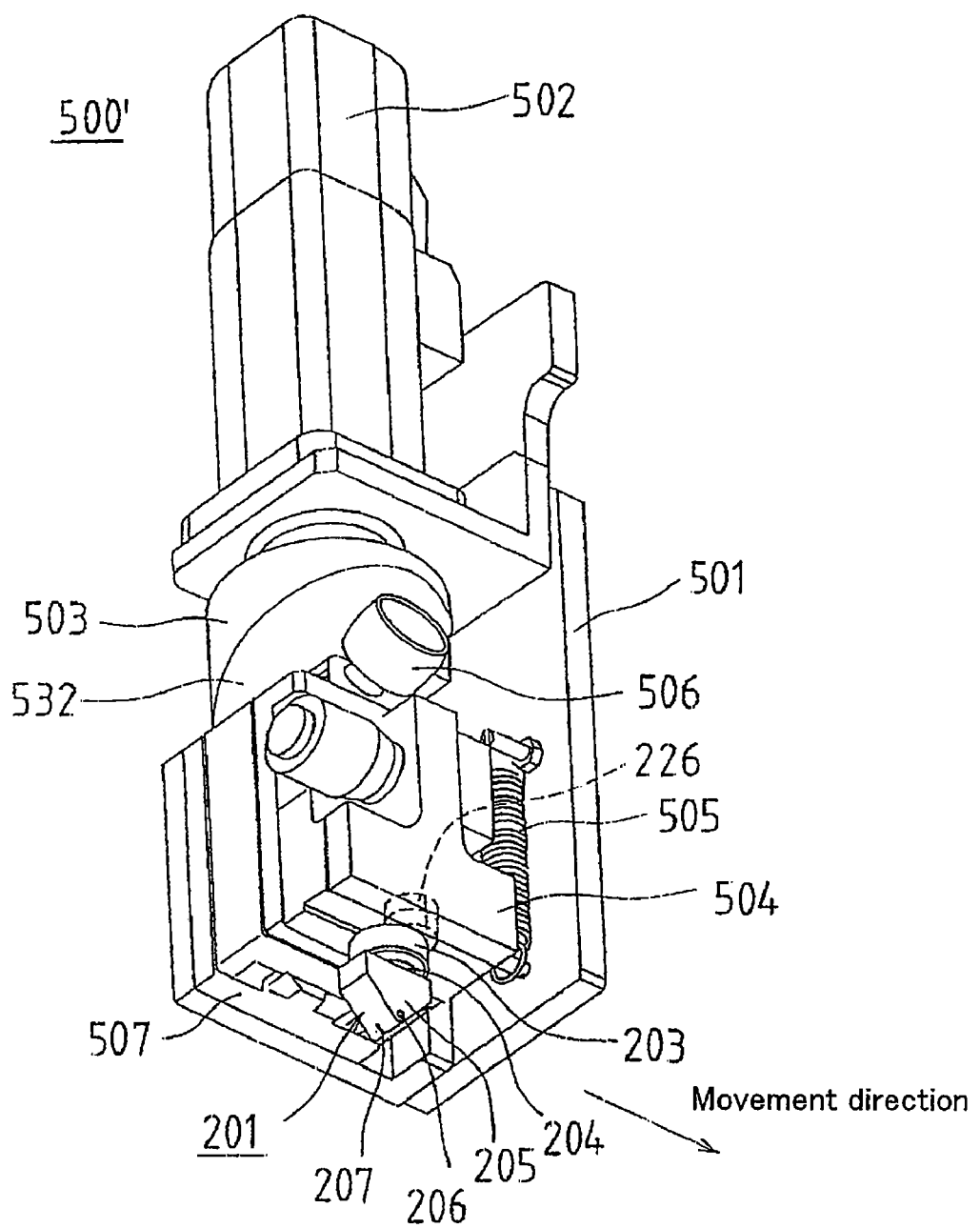
FIG. 13 is a diagram showing a structure of a scribing head 500' which is another example of the scribing head.

FIG. 10 shows a structure of a scribing head 200' which is another example of the scribing head. FIG. 11 shows a structure of a scribing head 400' which is another example of the scribing head. FIG. 12 shows a structure of a scribing head 600' which is another example of the scribing head. FIG. 13 shows a structure of a scribing head 500' which is another example of the scribing head.

In FIG. 10 to FIG. 13, the same components as those shown in FIG. 2, FIG. 6 and FIG. 9 are denoted by the same reference numerals, and the description thereof will be omitted.

According to the scribing head 200' the scribing head 400' the scribing head 600' and the scribing head 500', the turning about the first turning axis 204 and the second turning axis 202 is not restricted. The reason for this is that the holder body 205 and the holder 203 are provided so as to be positioned below the bearing case 225, the holder holding member 404 or the holder holding member 504.

The scribing head 200', the scribing head 400', the scribing head 600' and the scribing head 500' can be effectively employed in a state where the change of the processing reaction force received by the scribing line forming means 207 during the scribing operation is previously predicted and the turning of the holder body 205 is not so large even if a large change occurs.

At least one of the scribing head 200', the scribing head 400', the scribing head 600' and the scribing head 500' can be applied to the scribing apparatus 100 which has been described with reference to FIG. 1, instead of the scribing head 200 or in addition to the scribing head 200 which has been described with reference FIG. 2. The scribing apparatus 100 including at least one of the scribing head 200', the scribing head 400', the scribing head 600' and the scribing head 500' can perform the scribing line forming process procedure which has been described with reference to FIG. 5 and FIG. 7.

10. Scribing Apparatus Including a Multi-Head

Figure 14:
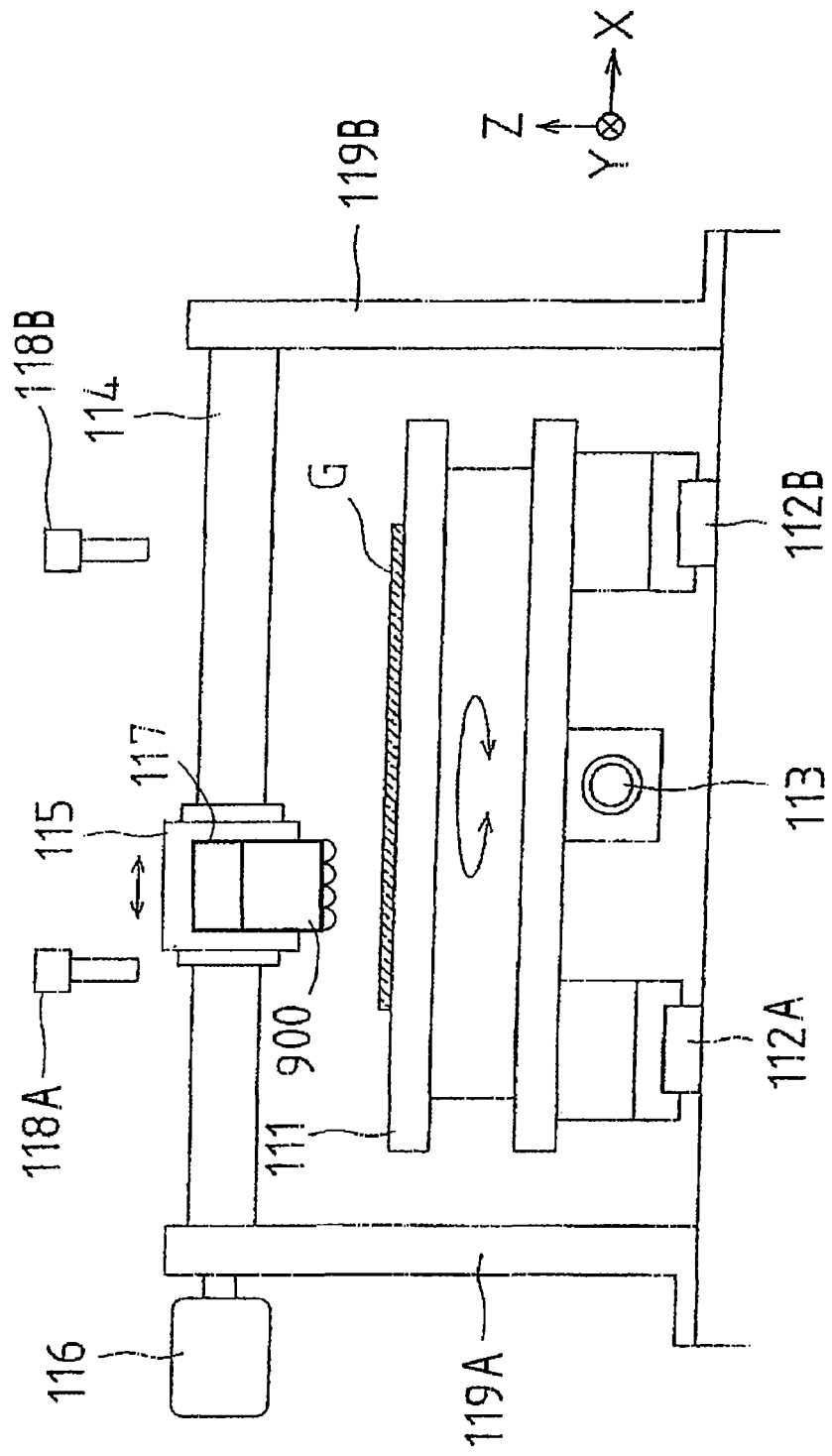
FIG. 14 is a diagram showing a structure of a scribing apparatus 800 which is another example of the scribing apparatus.
Figure 15:
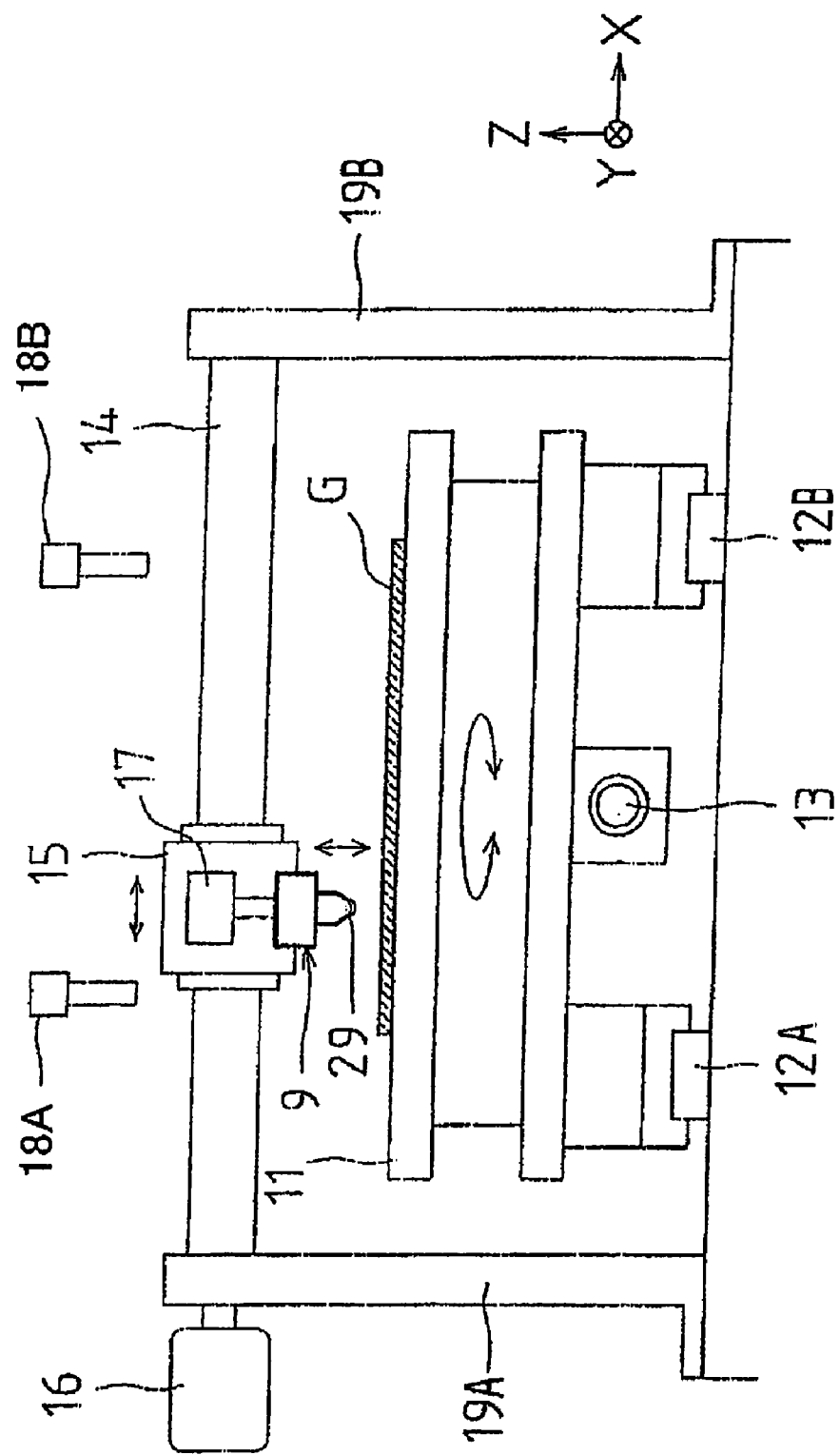
FIG. 15 is a diagram showing an example of a structure of a conventional scribing apparatus 10.
Figure 17:
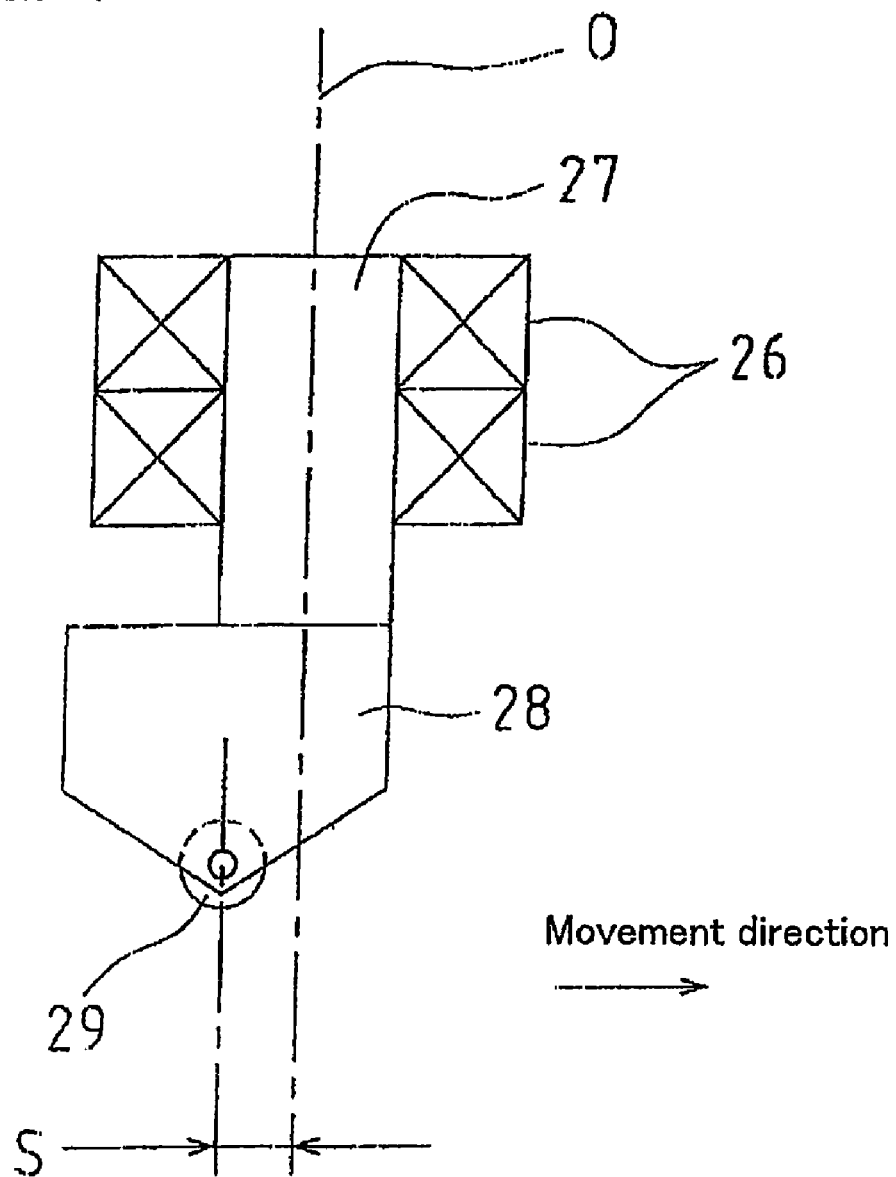
FIG. 17 is a diagram showing a cutter wheel, a cutting edge holder and a turning axis.
Figure 18:
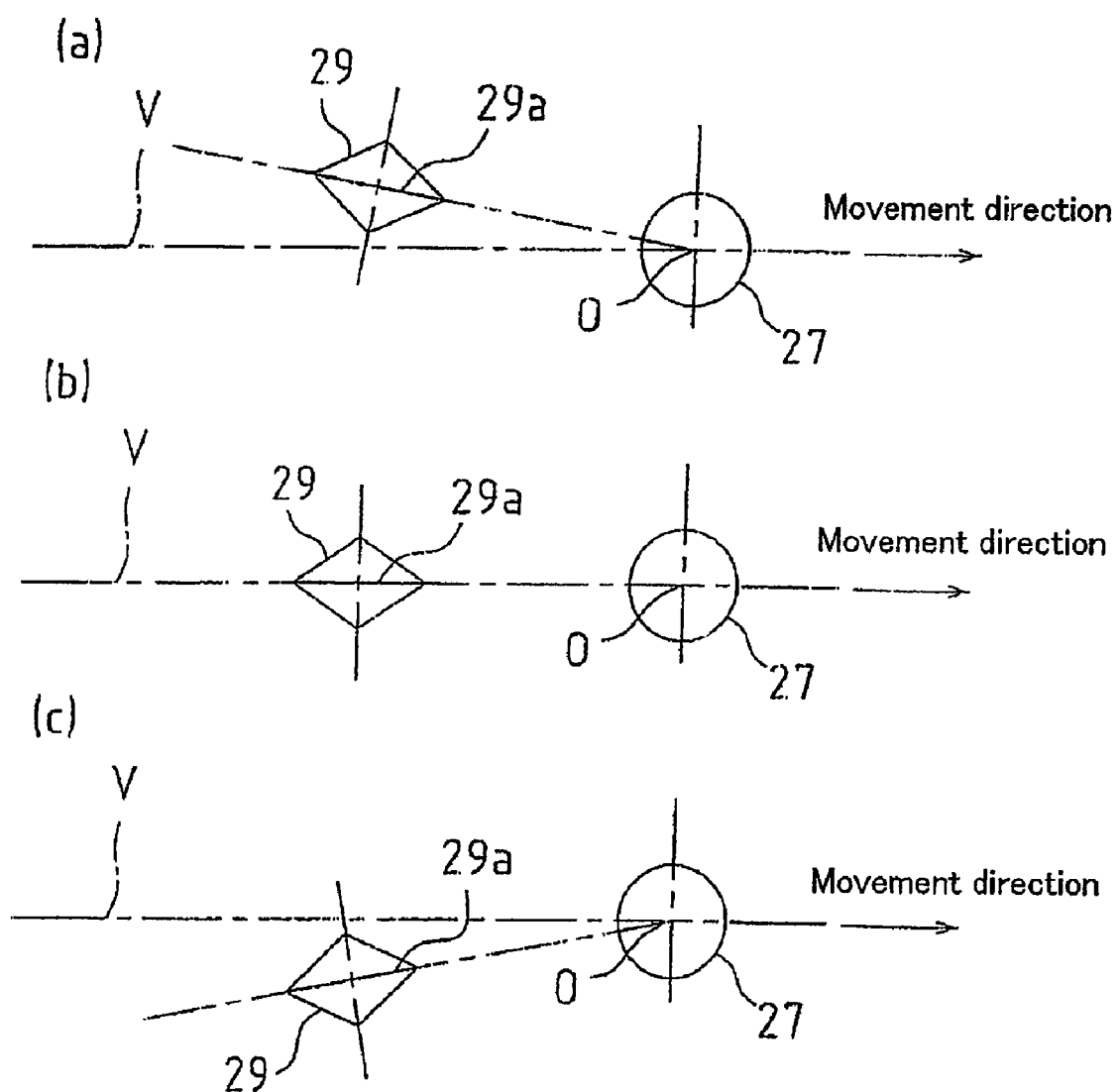
FIG. 18 is a diagram showing a positional relationship between a cutter wheel 29 and a turning axis 27 at the time of movement of the scribing head 9.
Figure 20:
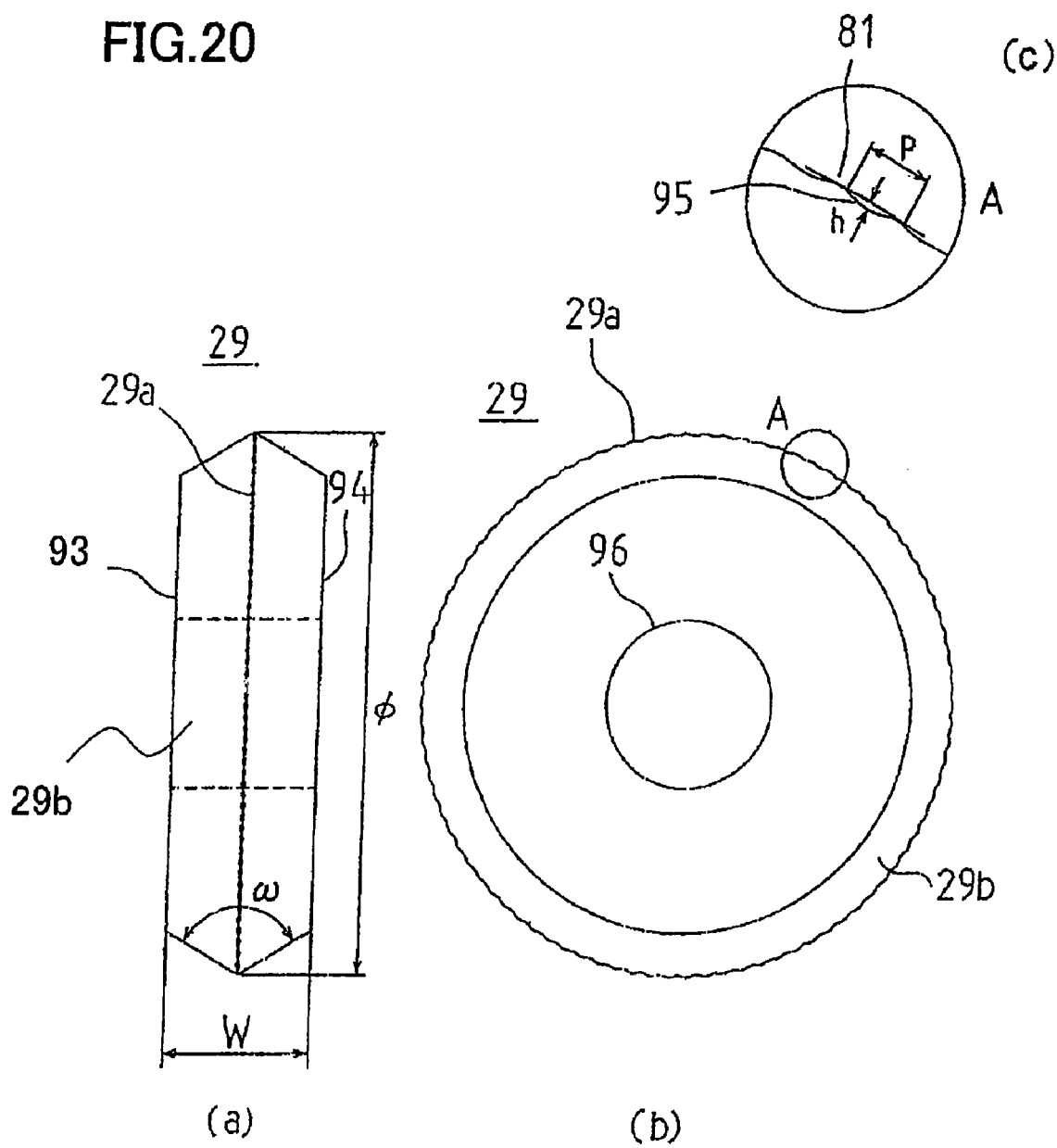
FIG. 20 is a diagram showing a structure of the cutter wheel 29.

FIG. 14 shows a structure of a scribing apparatus 800 which is another example of the scribing apparatus. In FIG. 14, the same components as those shown in FIG. 1 are denoted by the same reference numerals, and the description thereof will be omitted.

The scribing apparatus 800 has the same structure as the scribing apparatus 100 which has been described with reference to FIG. 1 except that in the scribing head 800, a multi-head 900 is included, instead of the scribing head 200 included in the scribing apparatus 100.

The multi-head 900 includes a plurality of scribing heads. The plurality of scribing heads includes at least one of the cylindrical cam-type scribing head 500 which has been described with reference to FIG. 9 and the cylindrical cam-type scribing head 500' which has been described with reference to FIG. 14.

According to the cylindrical cam-type scribing head 500 and the cylindrical cam-type scribing head 500', the servo motor 402 and the servo motor 502 are attached in a longitudinal direction. Thus, only a small amount of attachment space is needed. Therefore, when a plurality of scribing heads are mounted in a scribing apparatus, numerous scribing heads can be attached with a small amount of space when compared to a conventional scribing head having a motor mounted thereon.

The scribing apparatus according to the present invention runs the plurality of scribing heads simultaneously. Therefore, scribing lines, the number of which corresponds to the number of the plurality of scribing heads, are formed. As a result, when a plurality of unit substrates are cut from one substrate, production efficiency can be improved.

The scribing apparatus 800 can perform the scribing line forming process procedure which has been described with reference to FIG. 5 and FIG. 7.

For example, a scribing line forming processing program for causing to an execution of the function of the scribing head according to the present invention or the function of the scribing apparatus according to the present invention is stored in the scribing head according to the present invention or the scribing apparatus according to the present invention.

When the scribing head or scribing apparatus is shipped, the processing program can be previously stored in a storage means included in the scribing head or the scribing apparatus. Alternatively, after the scribing head or scribing apparatus is shipped, the processing program can be stored in the storage means. For example, a user can download a processing program with or without charge from a particular website on the Internet and install the processing program downloaded onto a scribing head or a scribing apparatus.

When a processing program is recorded in a computer-readable recording medium (e.g., flexible disc, CD-ROM and DVD-ROM), the processing program can be installed in a scribing head or a scribing apparatus by using an input device. The processing program installed is stored in the storage means.

As described above, the Embodiment according to the present invention has been described with reference to FIG. 1 to FIG. 14.

The scribing line forming mechanism, the scribing head and the scribing apparatus according to the present invention can be applied to the cutting of, for example, a liquid crystal display panel, a plasma display panel, an organic EL panel, an inorganic EL panel which are a kind of flat display panel, a transmissive projector substrate and a reflective projector substrate.

Furthermore, the scribing line forming mechanism, the scribing head and the scribing apparatus according to the present invention can be applied to the cutting of, for example, one single substrate (e.g., glass plate, glass substrate, quartz plate, quartz substrate, sapphire plate, sapphire substrate, semiconductor wafer, ceramic plate and ceramic substrate). Furthermore, the scribing line forming mechanism, the scribing head and the scribing apparatus according to the present invention can be effectively applied to the cutting of a bonded substrate for which a plurality of substrates are bonded.

As described above, the scribing line forming mechanism, the scribing line head and the scribing apparatus according to the present invention have been described above with reference to FIG. 1 to FIG. 14. However, the present invention should not be interpreted solely based on the embodiments described above. It is understood that the scope of the present invention should be interpreted solely based on the claims. It is also understood that those skilled in the art can implement equivalent scope of technology, based on the description of the present invention and common knowledge from the description of the detailed preferred embodiments of the present invention. Furthermore, it is understood that any patent, any patent application and any references cited in the present specification should be incorporated by reference in the present specification in the same manner as the contents are specifically described therein.

INDUSTRIAL APPLICABILITY

According to the scribing line forming mechanism, the scribing head and the scribing apparatus of the present invention, the scribing line forming means follows the movement direction of the second turning axis owing to the caster effect, and at the same time, the scribing line forming means can turn in a manner such that an error between the scribing line forming means and a supporting means is smaller. As a result, it is possible to reduce the force which acts in the horizontal direction of the substrate between the scribing line forming means and the substrate, thereby preventing the occurrence of a horizontal crack. It is possible to prevent the meandering of the scribing line forming means and form a scribing line with a high degree of straightness.

The invention claimed is:

1. A scribing apparatus comprising:
    a scribing line forming means being structured so as to form a scribing line on a substrate by contacting the substrate, and the scribing line forming means is configured to move on a surface of the substrate to form the scribing line on the surface of the substrate along a movement path line of the scribing line forming means;
    a supporting means for supporting the scribing line forming means such that the scribing line forming means is turnable about a first turning axis, the supporting means being structured so as to be turnable about a second turning axis, the second turning axis being different from the first turning axis, wherein
        the axial center of the first turning axis and the axial center of the second turning axis are approximately in parallel,
        the first turning axis extends through the scribing line forming means and the second turning axis extends through the supporting means, and
        the axial center of the second turning axis is distant by a predetermined interval from a portion where the substrate and the scribing line forming means contact each other and the axial center of the second turning axis is substantially perpendicular to a surface of the substrate;
    a scribing head comprising a scribing line forming mechanism, wherein the scribing line forming mechanism comprises the scribing line forming means and the supporting means, and wherein the scribing head further comprises a pressure application means for applying a pressure force to the scribing apparatus in order to press the scribing line forming means onto the substrate; and
    a moving means for moving the scribing head on a surface, the surface being approximately parallel to the substrate, such that the scribing line forming means forms the scribing line on the substrate, wherein the scribing line is formed in a same direction as a moving direction of the scribing head.

2. The scribing apparatus according to claim 1, wherein the scribing line forming means includes a cutter wheel, and
    the supporting means includes a cutter supporting means for the cutter wheel such that the cutter wheel is rotatable.

3. The scribing apparatus according to claim 1, wherein the supporting means includes a bearing for supporting the scribing line forming means.

4. The scribing apparatus according to claim 1, wherein the scribing head further comprises:
    a first supporting means for supporting the supporting means such that the supporting means is turnable about the second turning axis; and
    a restraining means for restricting a movement of the scribing line forming means towards the substrate, wherein
    the first supporting means is structured so as to be turnable about a third turning axis, the third turning axis having an axial center substantially perpendicular to the axial center of the second turning axis,
    the restraining means is structured so as restrain the turning of the first supporting means about the third turning axis and such that a portion of the first supporting means contacts the restraining means.

5. The scribing apparatus according to claim 4, wherein the first supporting means includes a turning restriction means for restricting the turning of the supporting means about the second turning axis.

6. The scribing apparatus according to claim 5, wherein the turning restriction means is formed in a portion of the first supporting means so as to accommodate at least a portion of the scribing line forming means.

* * * * *